United States Patent
He et al.

(10) Patent No.: US 11,340,057 B2
(45) Date of Patent: May 24, 2022

(54) SYSTEMS AND METHODS FOR INTERFEROMETRIC MULTIFOCUS MICROSCOPY

(71) Applicants: Northwestern University, Evanston, IL (US); UChicago Argonne, LLC, Chicago, IL (US); The University of Chicago, Chicago, IL (US)

(72) Inventors: Kuan He, Cupertino, CA (US); Oliver Strider Cossairt, Evanston, IL (US); Aggelos K. Katsaggelos, Chicago, IL (US); Norbert Scherer, Chicago, IL (US); Mark Hereld, Chicago, IL (US)

(73) Assignees: Northwestern University, Evanston, IL (US); UChicago Argonne, LLC, Chicago, IL (US); The University of Chicago, Chicago, IL (US)

( * ) Notice: Subject to any disclaimer, the term of this patent is extended or adjusted under 35 U.S.C. 154(b) by 0 days.

(21) Appl. No.: 15/734,172

(22) PCT Filed: Jun. 21, 2019

(86) PCT No.: PCT/US2019/038394
§ 371 (c)(1),
(2) Date: Dec. 1, 2020

(87) PCT Pub. No.: WO2019/246478
PCT Pub. Date: Dec. 26, 2019

(65) Prior Publication Data
US 2021/0215472 A1    Jul. 15, 2021

Related U.S. Application Data

(60) Provisional application No. 62/688,646, filed on Jun. 22, 2018.

(51) Int. Cl.
*G01B 9/04* (2006.01)
*G01B 9/02* (2022.01)
(Continued)

(52) U.S. Cl.
CPC ........... *G01B 9/04* (2013.01); *G01B 9/02041* (2013.01); *G01N 21/4788* (2013.01); *G02B 21/361* (2013.01)

(58) Field of Classification Search
CPC .. G01B 9/04; G01B 9/02041; G01B 9/02018; G01B 9/02024; G01B 9/02027;
(Continued)

(56) References Cited

U.S. PATENT DOCUMENTS 5,838,433 A * 11/1998 Hagiwara ................. G03F 1/84
356/364
2004/0092045 A1   5/2004 Bultman et al.
(Continued)

OTHER PUBLICATIONS

M. G. L. Gustafsson, D. A. Agard, J. W. Sedat, "Sevenfold improvement of axial resolution in 3D wide-field microscopy using two objective-lenses," in Three-Dimensional Microscopy: Image Acquisition and Processing II, T. Wilson, C. J. Cogswell, eds., Proc. SPIE2412, 147-156 (1995).
(Continued)

*Primary Examiner* — Jonathan M Hansen
(74) *Attorney, Agent, or Firm* — Bell & Manning, LLC

(57) ABSTRACT

A system to generate image representations includes a first objective that receives a first light beam emitted from a sample and a second objective that receives a second light beam emitted from the sample, where the first light beam and the second light beam have conjugate phase. The system also includes a first diffractive element to receive the first light beam and separate it into a first plurality of diffractive light beams that are spatially distinct, and a second diffractive element to receive the second light beam and separate
(Continued)

it into a second plurality of diffractive light beams that are spatially distinct. The system further includes a detector that receives the first and second plurality of diffractive light beams. The first plurality of diffractive light beams and the second plurality of diffractive light beams are simultaneously directed and focused onto different portions of an image plane of the detector.

20 Claims, 14 Drawing Sheets

(51) Int. Cl.
  *G01N 21/47* (2006.01)
  *G02B 21/36* (2006.01)
(58) Field of Classification Search
  CPC ............ G01B 9/02028; G01B 9/02042; G01B 9/02043; G01B 2290/20; G01N 21/4788; G02B 21/361; G02B 21/0056; G02B 21/18; G02B 21/367
  See application file for complete search history.

(56) References Cited

U.S. PATENT DOCUMENTS

| | | | |
|---|---|---|---|
| 2008/0037024 | A1 | 2/2008 | Backman et al. |
| 2008/0158551 | A1* | 7/2008 | Hess ................. G01B 9/02007 356/73 |
| 2008/0259345 | A1* | 10/2008 | Fukutake ............ G03H 1/0005 356/450 |
| 2018/0113292 | A1 | 4/2018 | Novikau et al. |

OTHER PUBLICATIONS

P. Prabhat, S. Ram, E. S. Ward, and R. J. Ober, "Simultaneous imaging of different focal planes in fluorescence microscopy for the study of cellular dynamics in three dimensions," IEEE Trans. Nano bioscience 3(4), 237-242 (2004).
S. Ram, P. Prabhat, J. Chao, E. S. Ward, and R. J. Ober, "High accuracy 3D quantum dot tracking with multifocal plane microscopy for the study of fast intracellular dynamics in live cells," Biophys. J. 95, 6025-6043 (2008).
S. Ram, D. Kim, R. J. Ober, and E. S. Ward, "3D single molecule tracking with multifocal plane microscopy reveals rapid intracellular transferrin transport at epithelial cell barriers," Biophys. J. 103, 1594-1603 (2012).
P. Prabhat, Z. Gan, J. Chao, S. Ram, C. Vaccaro, S. Gibbons, R. J. Ober, and E. S. Ward, "Elucidation of intracellular recycling pathways leading to exocytosis of the Fc receptor, FcRn, by using multifocal plane microscopy," Proc. Natl. Acad. Sci. USA 104, 5889-5894 (2007).
P. M. Blanchard, and A. H. Greenaway, "Simultaneous multiplane imaging with a distorted diffraction grating," Appl. Opt., 38(32), 6692-6699 (1999).
P. A. Dalgarno, H. I. C. Dalgarno, A. Putoud, R. Lambert, L. Paterson, D. C. Logan, D. P. Towers, R. J. Warburton, and A. H. Greenaway, "Multiplane imaging and three-dimensional nanoscale particle tracking in biological microscopy," 18, 877-884 (2010).
S. Abrahamsson, J. Chen, B. Hajj, S. Stallinga, A. Y. Katsov, J. Wisniewski, G. Mizuguchi, P. Soule, F. Mueller, C. D. Darzacq, X. Darzacq, C. Wu, C. I. Bargmann, D. A. Agard, M. Dahan, and M. G. L. Gustafsson, "Fast multicolor 3D imaging using aberration-corrected multifocus microscopy," Nat. Methods, 10, 60-63 (2013).
B. Bailey, D. L. Farkas, D. L. Taylor, and F. Lanni, "Enhancement of axial resolution in fluorescence microscopy by standing-wave excitation," Nature, 366, 44-48 (1993).
G. Shtengel, J. A. Galbraith, C. G. Galbraith, J. Lippincott-Schwartz, J. M. Gillette, S. Manley, R. Sougrat, C. M. Waterman, P. Kanchanawong, M. W. Davidson, R. D. Fetter, and H. F. Hess,
"Interferometric fluorescent super-resolution microscopy resolves 3D cellular ultrastructure," Proc. Natl. Acad. Sci. U.S.A. 106(9), 3125-3130 (2009).
D. Aquino, A. Schonle, C. Geisler, C. V. Middendorff, C. A. Wurm, Y. Okamura, T. Lang, S. W. Hell, and A. Egner, "Two-color nanoscopy of three-dimensional volumes by 4Pi detection of stochastically switched fluorophores," Nat. Methods, 8(4), 353-359 (2011).
H. Wang, C. J. R. Sheppard, K. Ravi, S. T. Ho, and G. Vienne, "Fighting against diffraction: apodization and near field diffraction structures," Laser Photonics Rev. 6, 354-392 (2012).
J. Bewersdorf, R. Schmidt, and S. W. Hell, "Comparison of I5M and 4Pi-microscopy," J. Microsc., 222(2), 105-117 (2006).
M. Nagorni and S. W. Hell, "Coherent use of opposing lenses for axial resolution increase in fluorescence microscopy. I. Comparative study of concepts," J. Opt. Soc. Am. A, 18, 36-48 (2001).
W. wang and G. Situ, "Interferometric rotating point spread function and its application in localization based super resolution imaging," Scientific Reports, 7(1), 5882 (2017).
R. W. Gerchberg and W. O. Saxton, "A practical algorithm for the determination of phase from image and diffraction plane pictures," Optik, 35, 237-246 (1972).
J. N. Mait, "Understanding diffractive optic design in the scalar domain," J. Opt. Soc. Am. A, 12, 2145-2158 (1995).
A. Tahmasbi, S. Ram, J. Chao, A. V. Abraham, F. W. Tang, E. S. Ward, and R. J. Ober, "Designing the focal plane spacing for multifocal plane microscopy," 22(14), 16706-16721 (2014).
L. Shao, B. Isaac, S. Uzawa, D. A. Agard, J. W. Sedat, and M. G. L. Gustafsson, "I5S: Wide-field light microscopy with 100-nm-Scale resolution in three dimensions," Biophys. J. 94, 4971-4983 (2008).
S. Abrahamsson, H. Blom, A. Agostinho, D. C. Jans, A. Jost, M. Müller, L. Nilsson, K. Bernhem, Talley J. Lambert, R. Heintzmann, and H. Brismar, "Multifocus structured illumination microscopy for fast volumetric super-resolution imaging," Biomed. Opt. Express, 8, 4135-4140 (2017).
N. Dey, L. Blanc-Feraud, C. Zimmer, P. Roux, Z. Kam, J. C. Olivo-Marin, and J. Zerubia, "Richardson-Lucy algorithm with total variation regularization for 3D confocal microscope deconvolution," Microsc. Res. Tech. 69(4), 260-266 (2006).
X. Huang, A. Selewa, X. Wang, M. K. Daddysman, I. Gdor, R. Wilton, K. M. Kemner, S. Yoo, A. K. Katsaggelos, K. He, O. Cossairt, N. J. Ferrier, M. Hereld, and N. F. Scherer, "3D snapshot microscopy of extended objects," arXiv:1802.01565 (2018).
S. Yoo, P. Ruiz, X. Huang, K. He, M. Hereld, A. Selewa, M. Daddysman, N. Scherer, O. Cossairt, and A. K. Katsaggelos, "3D image reconstruction from multi-focus microscope: axial super-resolution and multiple-frame processing," in Proc. IEEE Int. Conf. Acoustic, Speech, and Signal Processing, Apr. 2018.
S. Ram, P. Prabhat, E. S. Ward, and R. J. Ober, "Improved single particle localization accuracy with dual objective multifocal plane microscopy," 17(8), 6881-6898 (2009).
C. V. Middendorff, A. Egner, C. Geisler, S. W. Hell, and A. Schönle, "Isotropic 3D Nanoscopy based on single emitter switching," 16(25), 20774-20788 (2008).
S. W. Hell, R. Schmidt, and A. Egner, "Diffraction-unlimited three-dimensional optical nanoscopy with opposing lenses," Nat. Photon. 3, 381-387 (2009).
R.J. Ober, S. Ram, and S.E. Ward, "Localization accuracy in single-molecule microscopy," Biophys. J. 86, 1185-1200 (2004).
T. Kues, R. Peters, and U. Kubitscheck, "Visualization and tracking of single protein molecules in the cell nucleus," Biophys. J. 80, 2954-2967 (2001).
U. Kubitscheck, O. Kuckmann, T. Kues, and R. Peters, "Imaging and tracking single GFP molecules in solution," Biophys. J. 78, 2170-2179 (2000).
D. Sage, L. Donati, F. Soulez, D. Fortun, G. Schmit, A. Seitz, R. Guiet, C. Vonesch, and M. Unser, "DeconvolutionLab2: An Open-Source Software for Deconvolution Microscopy," Methods 115, 28-41 (2017).
The International Search Report and Written Opinion dated Sep. 13, 2019 for International Patent Application No. PCT/US19/38394; pp. 1-8.

(56) References Cited

OTHER PUBLICATIONS

S. Abrahamsson, M. McQuilken, S. B. Mehta, A. Verma, J. Larsch, R. Ilic, R. Heintzmann, C. I. Bargmann, A. S. Gladfelter, and R. Oldenbourg, "MultiFocus Polarization Microscope (MF-PolScope) for 3D polarization imaging of up to 25 focal planes simultaneously," 23, 7734-7754 (2015).

* cited by examiner

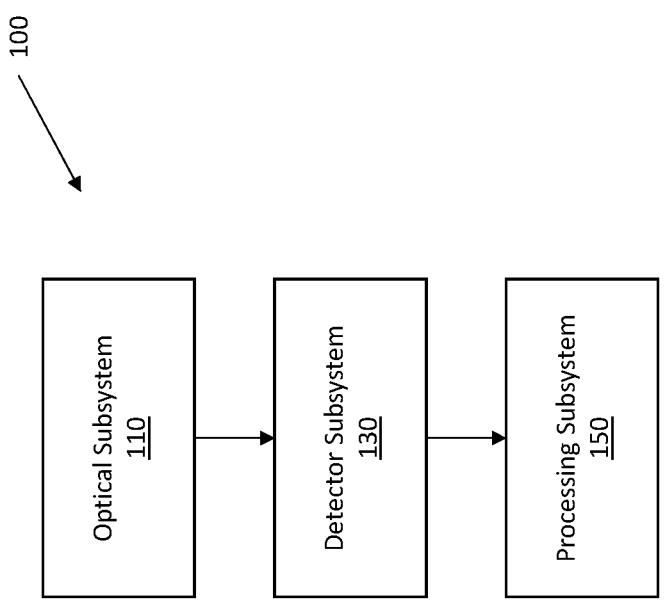

| | | |
|---|---|---|
| E(-4Δz) | E(-3Δz) | E(-2Δz) |
| E(-Δz) | E(0Δz) | E(Δz) |
| E(2Δz) | E(3Δz) | E(4Δz) |

FIG. 2B

| | | |
|---|---|---|
| E*(-4Δz) | E*(-3Δz) | E*(-2Δz) |
| E*(-Δz) | E*(0Δz) | E*(Δz) |
| E*(2Δz) | E*(3Δz) | E*(4Δz) |

FIG. 2C

| | | |
|---|---|---|
| -4Δz | -3Δz | -2Δz |
| -Δz | 0 | Δz |
| 2Δz | 3Δz | 4Δz |

FIG. 2D

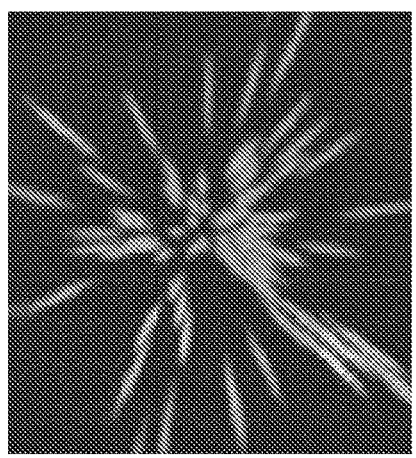
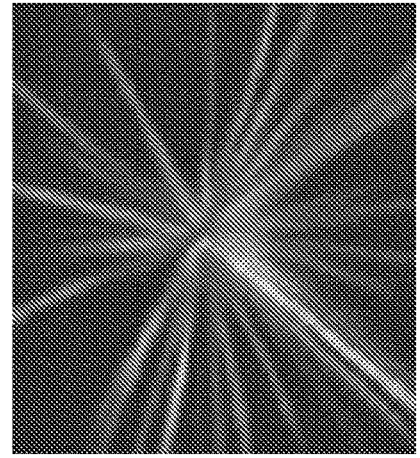
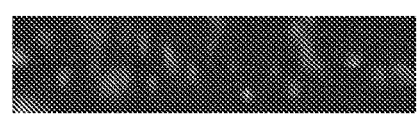
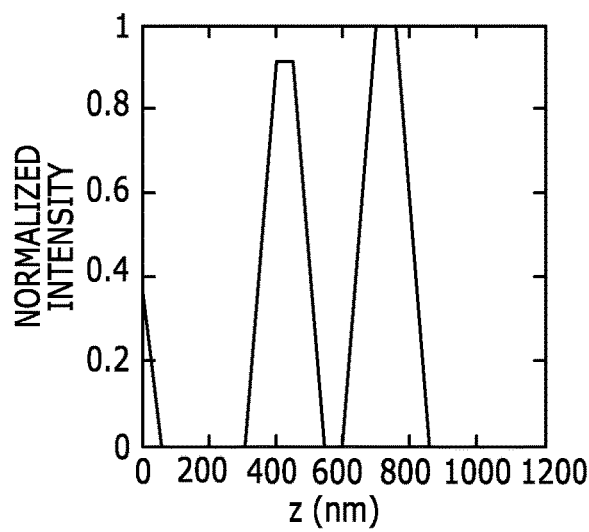
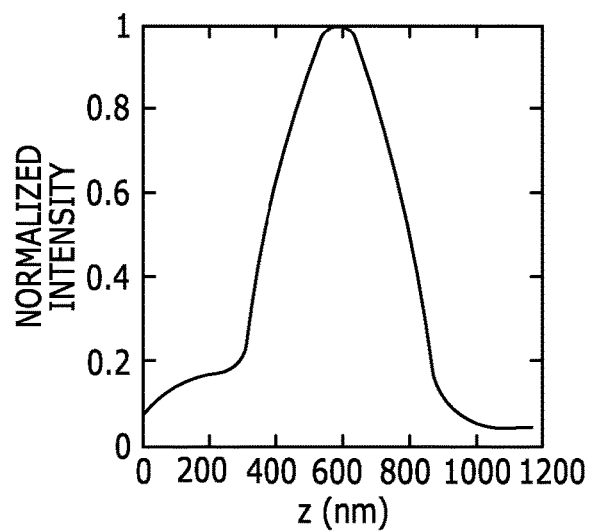
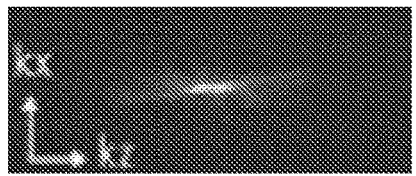
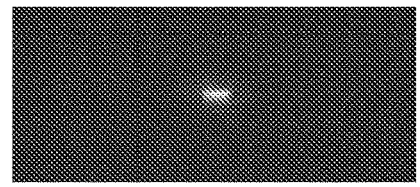
FIG. 10A                                FIG. 10B

SYSTEMS AND METHODS FOR INTERFEROMETRIC MULTIFOCUS MICROSCOPY

CROSS-REFERENCE TO RELATED APPLICATION

This application is a National Stage of International Application No. PCT/US19/38394, filed Jun. 21, 2019, which claims the benefit of U.S. patent application Ser. No. 62/688,646, filed Jun. 22, 2018, the contents of which are herein incorporated by reference.

REFERENCE TO GOVERNMENT RIGHTS

This invention was made with government support under Grant No. IIS-1453192 awarded by the National Science Foundation (NSF). Grant No. N00014-15-1-2735 awarded by the NSF, and Grant No. DE-AC02-06CH11357 awarded by the U.S. Department of Energy. The government has certain rights in the invention.

BACKGROUND

Fluorescence optical microscopy is an imaging tool widely used in molecular and cell biology because of its non-invasive and high biochemical labeling capabilities. A traditional fluorescence microscope system includes a light source, an excitation filter, a dichroic mirror or beam splitter, and an emission filter. The light source can be in the form of an arc lamp, a vapor lamp, light-emitting diodes (LEDs), a laser, etc. A specimen to be imaged is illuminated with light from the light source, at least a portion of which is absorbed by fluorophores in the specimen. The excitation filter is used to direct one or more desired wavelengths of light from the light source onto the specimen. Upon absorption of the light by the fluorophores, the fluorophores emit light which typically has a longer wavelength than the absorbed light. The emission filter is used to separate the emitted light (i.e., from the fluorophores) from that of the light source. The emitted light is then processed to develop an image of the specimen.

SUMMARY

Described herein is an interferometric multifocus microscopy (iMFM) imaging system that is able to achieve axial super resolution in a single shot. In an illustrative embodiment, the proposed iMFM imaging system may include a first objective that receives a first light beam emitted from a sample being imaged and a second objective that receives a second light beam emitted from the sample being imaged. In some embodiments, the first objective and the second objective are opposingly positioned (i.e., relative to the sample), and the first light beam and the second light beam have conjugate phase. Additionally, the first light beam and the second light beam can include light from different depth planes within the object.

The system may also include a first diffractive element that receives the first light beam passing through the first objective and that separates the received first light beam into a first plurality of diffractive light beams that are spatially distinct from each other. In some embodiments, each of the first plurality of diffractive light beams includes light from one of the different depth planes within the object. The system may also include a second diffractive element that receives the second light beam passing through the second objective and that separates the received second light beam into a second plurality of diffractive light beams that are spatially distinct from each other. Each of the second plurality of diffractive light beams can also include light from one of the different depth planes within the object.

The system can also include a detector that receives the first plurality of diffractive light beams and the second plurality of diffractive light beams. In some embodiments, each of the first plurality of diffractive light beams and the second plurality of diffractive light beams is directed and focused onto a different portion of an image plane of the detector simultaneously. As used herein, simultaneously refers to an event that happens at substantially the same time (i.e., the events may potentially occur fractions of a second apart). In some embodiments, the system may further include one or more optical elements that direct and focus each of the first plurality of diffractive light beams and the second plurality of diffractive light beams onto the different portions of the image plane of the detector at substantially the same time.

In some embodiments, the system can also include an image processing module that generates, from the directed first plurality of diffractive light beams and the directed second plurality of diffractive light beams, a three-dimensional image representation of the sample. In some embodiments, the three-dimensional representation of the object includes a combination of a plurality of two-dimensional images, where each of the one or more two-dimensional images corresponds to one of the different depth planes within the sample.

In some embodiments, the first diffractive element and the second diffractive element, which can be identical, are positioned in the Fourier plane of the imaging system. Each of the first diffractive element and the second diffractive element can also include a multi-focus grating (MFG). In some embodiments, the multi-focus grating includes a grating pattern having a geometrical distortion. The grating pattern can be a binary phase-only diffraction grating pattern or a multi-phase grating pattern. In an illustrative embodiment, the multi-focus grating focuses the first plurality of diffractive light beams and the second plurality of diffractive light beams by applying a phase shift that is equal to but opposite from a depth-induced phase error that is present on the light that emerges from out-of-focus planes in the sample. The phase shift can be provided by the geometrical distortion in the grating pattern of the multi-focus grating. Additionally, the multi-focus grating can apply the phase shift to a first wavefront of the light of the first plurality of diffractive light beams and to a second wavefront of the light of the second plurality of diffractive light beams, where the first wavefront and the second wavefront have conjugate phase.

Also described herein are methods for generating an image representation of an object. The method can include receiving a first light beam passing through a first objective of an imaging system and a second light beam passing through a second objective of the imaging system. In some embodiments, the first objective and the second objective are opposingly arranged relative to one another. The first light beam and the second light beam are emitted from a sample (or object) being imaged, and can have conjugate phase. Each of the first light beam and the second light beam can also include light from different depth planes within the sample.

The method can also include generating, based on the received first light beam and by a first diffractive element, a first plurality of diffractive light beams that are spatially distinct from each other. In some embodiments, each of the first plurality of diffractive light beams includes light from one of the different depth planes within the object. The method may also include generating, based on the received second light beam and by a second diffractive element, a second plurality of diffractive light beams that are spatially distinct from each other. In some embodiments, each of the second plurality of diffractive light beams includes light from one of the different depth planes within the object.

The method may also include directing and focusing each of the first plurality of diffractive light beams and the second plurality of diffractive light beams onto a different portion of an image plane of a detector simultaneously. The method may further include generating, from the directed first plurality of diffractive light beams and the directed second plurality of diffractive light beams, a three-dimensional image representation of the sample. In some embodiments, the three-dimensional representation of the sample includes one or more two-dimensional images, each of which corresponds to one of the different depth planes within the sample.

Another illustrative system to generate image representations includes a first objective that receives a first light beam emitted from a sample and a second objective that receives a second light beam emitted from the sample, where the first light beam and the second light beam have conjugate phase. The system also includes a first diffractive element to receive the first light beam and separate it into a first plurality of diffractive light beams that are spatially distinct, and a second diffractive element to receive the second light beam and separate it into a second plurality of diffractive light beams that are spatially distinct. The system further includes a detector that receives the first and second plurality of diffractive light beams. The first plurality of diffractive light beams and the second plurality of diffractive light beams are simultaneously directed and focused onto different portions of an image plane of the detector.

Another illustrative method for generating image representations includes receiving, by a first objective in a first arm of an optical subsystem, a first light beam emitted from a sample. The method also includes receiving, by a second objective in a second arm of the optical subsystem, a second light beam emitted from the sample, where the first light beam and the second light beam have conjugate phase. The method also includes separating, by a first diffractive element in a Fourier plane of the first arm of the optical subsystem, the first light beam into a first plurality of diffractive light beams that are spatially distinct from one other. The method also includes separating, by a second diffractive element in a Fourier plane of the second arm of the optical subsystem, the second light beam into a second plurality of diffractive light beams that are spatially distinct from one other. The method further includes receiving, by a detector, the first plurality of diffractive light beams and the second plurality of diffractive light beams such that the first plurality of diffractive light beams and the second plurality of diffractive light beams are simultaneously directed and focused onto different portions of an image plane of the detector.

BRIEF DESCRIPTION OF DRAWINGS

The foregoing and other objects, features, and advantages of the present disclosure set forth herein will be apparent from the following description of particular embodiments of those inventive concepts, as illustrated in the accompanying drawings. Also, in the drawings, the like reference characters refer to the same parts throughout the different views. The drawings depict only typical embodiments of the present disclosure and, therefore, are not to be considered limiting in scope.

FIG. 1 is a block diagram of an interferometric multifocus microscopy (iMFM) system for three-dimensional imaging in accordance with an illustrative embodiment.

FIG. 2B depicts an upper arm focal stack of a second diffractive element of the iMFM imaging system in accordance with an illustrative embodiment.

FIG. 2C depicts a lower arm focal stack of a first diffractive element of the iMFM imaging system in accordance with an illustrative embodiment.

FIG. 2D depicts an interferometric focal stack on the detector in accordance with an illustrative embodiment.

FIG. 10A depicts a 3D extended test object in accordance with an illustrative embodiment.

FIG. 10B depicts recovery of the 3D extended test object using MFM in accordance with an illustrative embodiment.

DETAILED DESCRIPTION

Figure 2A:
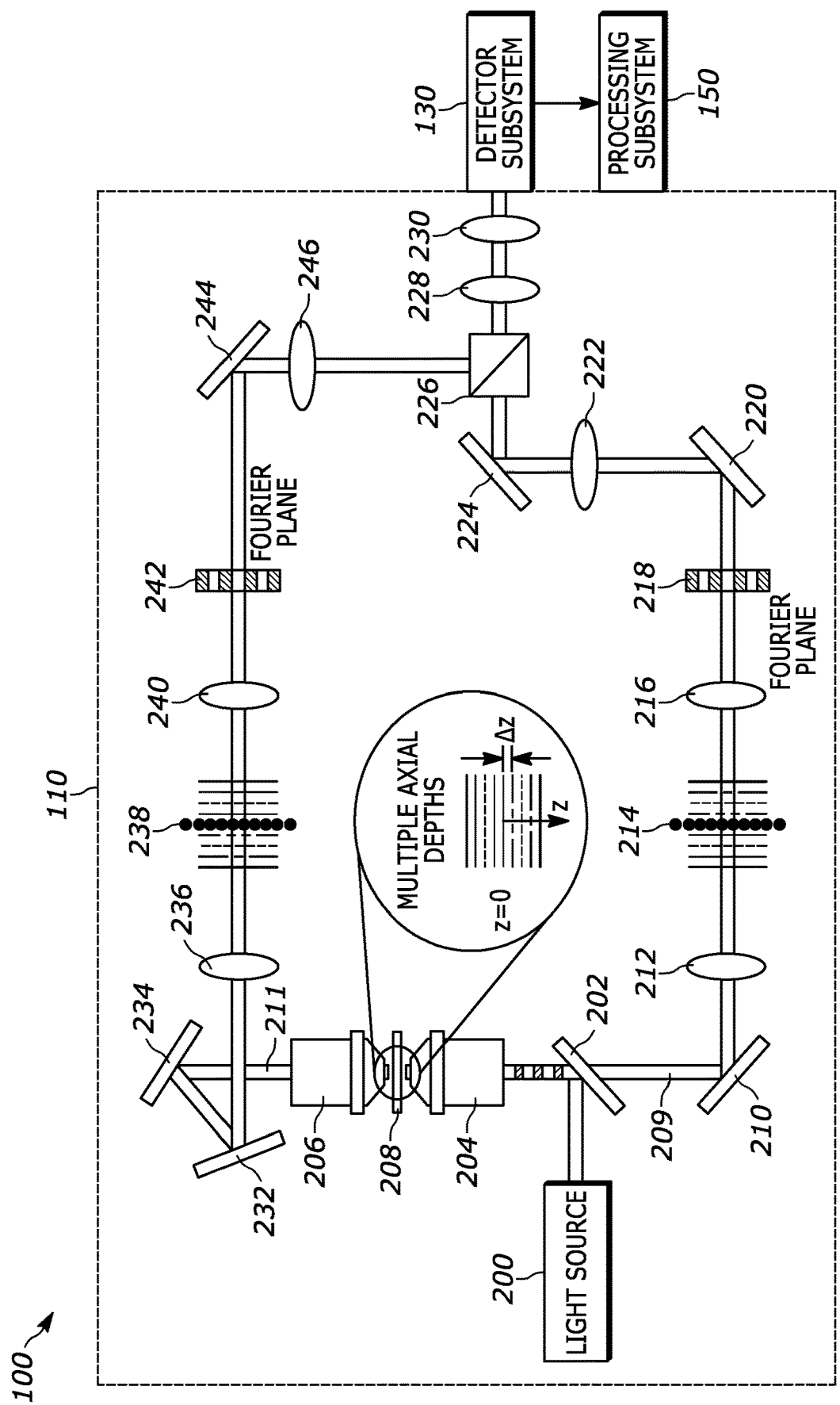
FIG. 2A is a detailed diagram of the iMFM imaging system of FIG. 1 in accordance with an illustrative embodiment.

Traditional fluorescence optical microscopy systems have fundamental limitations. First, in many instances, fluorescence optical microscopy is too slow to capture three-dimensional (3D) dynamic events, due to the long acquisition time that it takes to sequentially z scan the focal plane by moving either the object stage or objective lens. Second, the axial spatial resolution (roughly 500-700 nm) substantially lower than the lateral spatial resolution (roughly 200-300 nm) because of the limited collecting angles of an objective lens. In the single objective configuration, the 3D intensity point spread function (PSF) features an elongated focal spot along the optical axis, and its optical transfer function (OTF) suffers from a 'missing cone' problem along the axial direction, Which poses a particular challenge in 3D isotropic microscopy imaging.

To overcome the 3D imaging speed limitation, Multifocal Plane Microscopy (MUM) can be used to allow simultaneous acquisition of multiple focal planes in a single exposure time of the cameras. In some systems, this methodology was implemented by using multiple beam splitters and cameras. In such a scenerio, each camera is placed at a specific distance from the tube lens to enable the capture of images of a distinct focal plane within the sample. Arranging the cameras in such a manner typically only allows for the imaging of a limited number of distinct planes (commonly 4 planes) and becomes increasingly bulky if more planes are imaged since it utilizes one camera per focal plane. Another approach, known as Multifocus Microscopy (MFM), utilizes a distorted grating in the Fourier plane to image 9 or 25 focal planes on a single camera. The grating is designed to both diffract the light and also focus different focal depths into different diffraction orders, producing laterally shifted images of multiple focal depths on a 2D camera plane at the cost of the lateral field of view.

Techniques such as MUM and MFM have attracted significant interest in applications that involve the investigation of 3D dynamic samples. Examples include the tracking of a single molecule in three dimensions or the detection of a dynamic process in various samples, such as thick samples. However, like a conventional focal scanning microscope, both MUM and MFM suffer from the anisotropic 3D resolution problem due to the limited collecting angles of a single objective lens. For instance, in MUM single-particle tracking, the axial localization accuracy is relatively worse than the lateral one.

Described herein is a high speed and efficient imaging system that provides a higher axial resolution and hence isotropic 3D resolution in a single exposure. Aspects of the present disclosure involve an interferometric multifocus microscopy (iMFM) imaging system that provides significantly improved axial and hence isotropic 3D resolution with a single shot. The iMFM imaging system employs two special diffractive optical elements (DOEs) in the Fourier planes and two opposingly arranged objectives. Also described herein are simulation results for the iMFM imaging system. The simulation results illustrate that employing two DOEs enables the iMFM to ensure that the conjugate spherical wavefronts, emitted from the same molecule, are diffracted into the same tile on the detector, and hence interfere effectively after passing through two lenses. Both monochromatic and polychromatic point spread functions (PSFs) of the iMFM imaging system are simulated, and the image formation model is provided. The simulation results also illustrate that the iMFM imaging system is capable of recording multiple interferometric focal planes simultaneously in a single shot, which contains axial super-resolution information.

In other aspects, the present disclosure demonstrates various applications of the iMFM imaging system, including single molecule tracking and 3D extended object recovery. In addition, the present disclosure provides a calculation of the Fisher information matrix (FIM) and the Cramér-Rao lower bound (CRLB) of iMFM PSFs. The disclosure also describes a method to determine an initial axial position of a molecule to improve the convergence of a maximum likelihood estimation (MLE) localization algorithm in iMFM. The disclosure further demonstrates, both theoretically and numerically, that isotropic 3D nanoscopic localization accuracy is achievable with an axial imaging range of 2 micrometers ($\mu m$) when tracking a fluorescent molecule in three dimensions. Additionally, it is shown that diffraction limited axial resolution can be improved by at least three times in 3D extended object recovery with a single exposure by iMFM, which significantly increases the speed of the acquisition process of conventional dual-objective interferometric microscopes.

FIG. 1 is a block diagram of an interferometric multifocus microscopy (iMFM) system 100 for three-dimensional imaging in accordance with an illustrative embodiment. The system 100 includes an optical subsystem 110, a detector subsystem 130, and a processing subsystem 150. Alternatively, the system may include fewer, additional, and/or different components. The optical subsystem 110 can include one or more light sources. The one or more light sources may be tunable and capable of emitting lights with a wide range of frequencies. The optical subsystem 110 can also include one or more objectives and one or more optical elements (e.g., mirrors, tube lenses, etc.) to direct or focus light passing through the one or more objectives. In an illustrative embodiment, the system 100 utilizes a dual-objective detection scheme constituted by two detection arms, each of which includes an objective. Each detection arm of the optical subsystem 110 may also include a diffractive element such as a multi-focus grating (MFG) that separates light into spatially distinct diffractive orders (or diffractive light beams). The optical subsystem 110 can further include additional optical elements (e.g., mirrors, lenses, beam splitters, etc.) that direct light passing through the diffractive elements onto an image plane of a detector in the detector subsystem 130. The readouts from the detector subsystem 130 are processed and reconstructed by the processing subsystem 150 into an image representation of the object. The optical, detector, and processing components of the system 100 are described in more detail below.

FIG. 2A is a detailed diagram of the iMFM imaging system 100 in accordance with an illustrative embodiment. The optical subsystem 110 of the iMFM imaging system includes a light source 200 that is configured to emit light. The light source 200, which can be one or more light sources, can be a laser source, a light-emitting diode source, an arc lamp, a vapor lamp, etc. The light from the light source 200 is directed to a dichroic mirror 202 that reflects the light toward a sample 208 being imaged. A first objective 204 and a second objective 206 are positioned on the bottom and top of the sample 208, respectively, such that the objectives are opposingly positioned about the sample 208. In alternative embodiments, the objectives may be positioned differently relative to the sample 208 (e.g., on the sides, etc.). The first objective 204 receives a first light beam 209 emitted from the sample 208 and the second objective 206 receives a second light beam 211 emitted from the sample 208 in response to the light from the light source 200. In an illustrative embodiment, the first light beam 209 and the second light beam 211 have conjugate phase relative to one another. In some embodiments, each of the first light beam 209 and the second light beam 211 includes light from different depth planes within the sample 208.

The first objective 204, along with a series of mirrors, lenses, and a diffractive element, is part of a lower arm of the optical subsystem 110. The first light beam 209 received by the first objective 204 travels back through the dichroic mirror 202, reflects off a mirror 210 and through a tube lens 212 such that an intermediate image 214 is formed in the lower arm. The first light beam 209 travels through a lens 216 and into a Fourier plane of the lower arm where a diffractive element 218 is positioned. The first light beam 209 travels through the diffractive element 218, which separates the received first light beam 209 into a first plurality of diffractive light beams that are spatially distinct from one other. In an illustrative embodiment, each of the first plurality of diffractive light beams includes light from a distinct depth plane within the sample 208. The inset to FIG. 2A depicts different depth planes of the sample 208 in the z-direction and separated from one another by Δz. The first plurality of diffractive light beams reflect off of a mirror 220, through a lens 222, off of a mirror 224, through a beam splitter/combiner 226, through a lens 228, through a lens 230, and into the detector subsystem 130. The dichroic mirror 202, the mirrors 210, 220, 224, the tube lens 212, the lenses 216, 222, and the diffractive element 218 form the lower arm of the optical subsystem 110. In alternative embodiments, a different number, position, and/or combination of mirrors, lenses, and tube lenses may be used to form the lower arm.

The second objective 206, along with a series of mirrors, lenses, and a diffractive element, is part of an upper arm of the optical subsystem 110. The second light beam 211 receives by the second objective 206 reflects off of a mirror 232, off of a mirror 234, and through a tube lens 236 such that an intermediate image 238 is formed in the upper arm. The second light beam 211 travels through a lens 240 and into a Fourier plane of the upper arm where a diffractive element 242 is positioned. The second light beam 211 travels through the diffractive element 242, which separates the received second light beam 211 into a second plurality of diffractive light beams that are spatially distinct from one other. In an illustrative embodiment, each of the second plurality of diffractive light beams includes light from a distinct depth plane within the sample 208. The second plurality of diffractive light beams reflect off of a mirror 244, through a lens 246, through the beam splitter/combiner 226, through the lens 228, through the lens 230, and into the detector subsystem 130. The second objective 206, the mirrors 232, 234, 246, the tube lens 236, the lenses 240, 246, and the diffractive element 242 form the upper rm of the optical subsystem 110. In alternative embodiments, a different number, position, and/or combination of mirrors, lenses, and tube lenses may be used to form the upper arm.

The first diffractive element 218 and the second diffractive element 242 can be multi-focus gratings (MFGs) that are identical or substantially identical to one another (e.g., they may induce opposite phase shifts, but otherwise be the same). In some embodiments, the multi-focus grating (MFG) includes a grating pattern having a geometrical distortion. For example, the grating pattern can include a binary phase-only diffraction grating or a multi-phase grating. In such embodiments, the multi-focus gratings focus the first plurality of diffractive light beams and the second plurality of diffractive light beams by applying a phase shift that is equal to but opposite from a depth-induced phase error that is present on the light that emerges from out-of-focus planes in the object. The phase shift can be provided by the geometrical distortion in the grating pattern of the multi-focus grating. In some embodiments, the multi-focus grating applies the phase shift to a first wavefront of the light of the first plurality of diffractive light beams and to a second wavefront of the light of the second plurality of diffractive light beams, where the first wavefront and the second wavefront have conjugate phase.

As discussed above, the detector subsystem 130 receives the first plurality of diffractive light beams and the second plurality of diffractive light beams from the optical subsystem 110. In an illustrative embodiment, the detector subsystem 130 includes an electron-multiplying charge-coupled device (EMCCD) detector. Alternatively, a different type of detector may be used. In another illustrative embodiment, each of the first plurality of diffractive light beams and the second plurality of diffractive light beams is directed and focused onto a different portion of an image plane of the detector at substantially the same time. Various optical components of the optical subsystem 110 (e.g., elements 220, 222, 224, 226, 228, 230, 244, and 246) work together to direct and focus each of the first plurality of diffractive light beams and the second plurality of diffractive light beams onto the different portion of the image plane of the detector at substantially the same time. FIG. 2B depicts an upper arm focal stack of the second diffractive element 242 in accordance with an illustrative embodiment. FIG. 2C depicts a lower arm focal stack of the first diffractive element 218 in accordance with an illustrative embodiment. FIG. 2D depicts an interferometric focal stack on the detector in accordance with an illustrative embodiment.

Information from the detector subsystem 130 is provided to the processing subsystem 150. In an illustrative embodiment, the processing subsystem 150 can be local to the detector subsystem 130 and the information can be provided through a direct wired or wireless connection. Alternatively, the processing subsystem 150 may be remote to the detector subsystem 130 and the information can be provided through a network such as the Internet. The processing subsystem 150 can include one or more transceivers to receive the data, one or more memories to store the data, one or more interfaces to allow user interaction and the control, and one or more processors to analyze the data and form the 3D image representation(s) of the sample 208. In some embodiments, the three-dimensional representation of the sample 208 includes one or more two-dimensional images, where each of the one or more two-dimensional images corresponds to one of the different depth planes within the sample 208. An example processing subsystem is described in detail with reference to FIG. 11.

An alternative system to that depicted in FIG. 2A includes a dual-objective image interference microscopy ($I^2M$) with an MFM stage. In such a design, a regular $I^2M$ configuration is augmented by a 4f system (e.g., the relay lens system formed by the lens 228 and the lens 230) with a single multi-focus grating (MFG) in its Fourier plane (i.e., positioned between the lens 228 and the lens 230). In such a system, the emitted light from the same fluorescent point simultaneously enters both the first and second objectives with the conjugate wavefronts, and then is coherently added to form the interference pattern on a common beam splitter (BS) plane, as in $I^2M$. However, when these two conjugate wavefronts emitted from the same fluorescent point propagate through the same MFG, they will be diffracted and focused into the positive and the negative diffraction orders on the detector. In such a configuration, the MFG incorrectly interferes the top-left focal plane from the top arm of the interferometer with the top-left focal plane from the bottom arm of the interferometer, and the top-middle focal plane from the top arm of interferometer with the top-middle focal plane from the bottom arm of interferometer, and so on, until the bottom-right focal plane of the top arm is interferometrically combined with the bottom-right focal plane of the bottom arm. Therefore, such an $I^2M$+MFM configuration, the MFG may prohibit the correct interference to occur on the detector.

To overcome the above problem in such an $I^2M$+MFM system, the proposed iMFM imaging system 100 of FIG. 2A employs two MFGs that are placed in the Fourier planes, as shown. This iMFM configuration features a dual-objective detection scheme with an additional opposing objective lens. Each detection arm is similar to a conventional MFM, which includes an objective lens, a tube lens, and a 4f system (relay lens systems of the lenses 240, 246 in the upper arm and the lenses 216, 222 in the lower arm) with an MFG in the Fourier plane of each arm. According to MFM principle, each objective lens images multiple focal planes into an array of differently focused tiles on the detector within a single exposure of time.

One of the important differences between iMFM (shown in FIG. 2A) and an $I^2M$+MFM is that, in the iMFM imaging system, the emitted light is first split into multiple tiles and then coherently added on a common beam splitter/combiner plane. Hence, if two MFGs of opposite focal shifts are employed in the dual detection arms, the conjugate wavefronts from the same fluorescent point will be diffracted and focused on the same tile, and therefore interfere on the same area of the beam splitter/combiner and the detector. That is, the differing MFGs in each arm place focal planes at the sample place onto the same tile on the detector. Therefore, the proposed iMFM imaging system is capable of producing a focal stack of interferometric 2D images simultaneously on a single detector with a single exposure without focal scanning.

Figure 3:
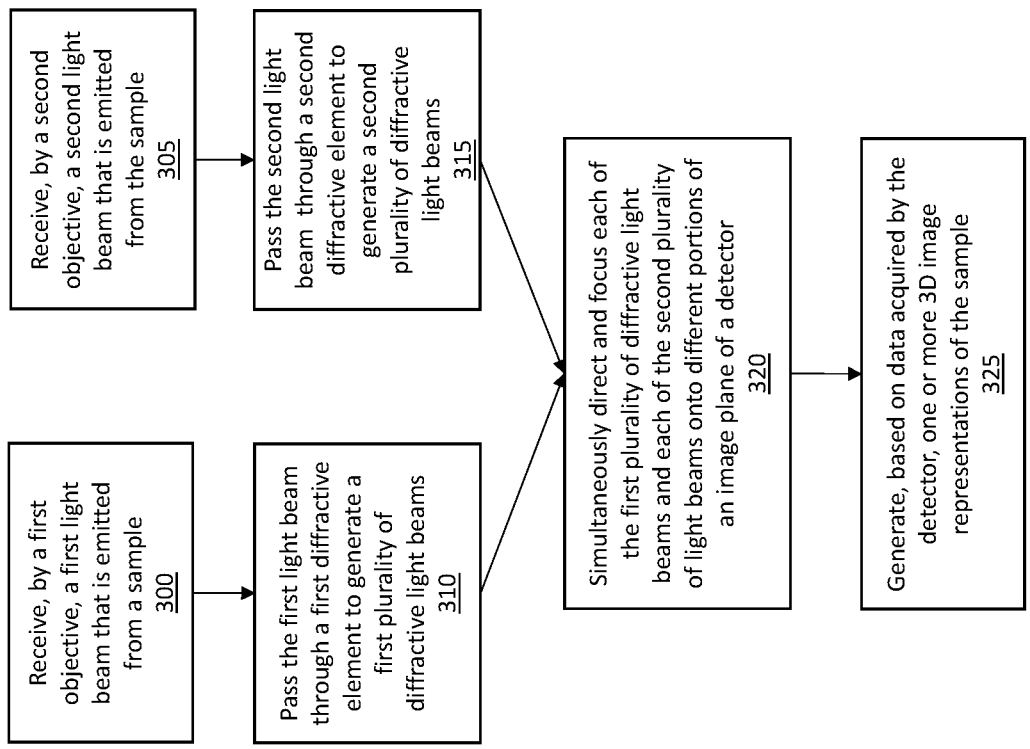
FIG. 3 is a flow diagram depicting operations performed by an iMFM imaging system in accordance with an illustrative embodiment.

FIG. 3 is a flow diagram depicting operations performed by an iMFM imaging system in accordance with an illustrative embodiment. In alternative embodiments, fewer, additional, and/or different operations may be performed. Additionally, the use of a flow diagram is not meant to be limiting with respect to the order of operations performed. In an operation 300, a first objective of the system receives a first light beam that is emitted from a sample. In an operation 305, a second objective of the system receives a second light beam that is emitted from the sample. In an illustrative embodiment, the first light beam and the second light beam are emitted from the sample responsive to light directed at the sample from one or more light sources. In another illustrative embodiment, the first objective and the second objective are positoined opposite to one another, and the first and second light beams include light from different depth planes within the object.

In an operation 310, the first light beam is passed through a first diffractive element to generate a first plurality of diffractive light beams. In an operation 315, the second light beam is passed through a second diffractive element to generate a second plurality of diffractive light beams. In an illustrative embodiment, the diffractive elements are multi-focus gratings having grating patterns with a geometrical distortion such that each of the first plurality of diffractive light beams has a different phase and each of the second plurality of diffractive light beams has a different phase. The first plurality of diffractive light beams are therefore spatially distinct from one another, and the second plurality of diffractive light beams are also spatially distinct from one another. Additionally, each of the first diffractive light beams includes light from a different depth plane within the sample, and each of the second diffractive light beams includes light a different depth plane within the sample. The first diffractive element can be positioned in a Fourier plane of a first optical arm of the system, and the second diffractive element can be positioned in a Fourier plane of a second optical arm of the system.

In some embodiments, the multi-focus gratings focus the first plurality of diffractive light beams and the second plurality of diffractive light beams by applying a phase shift that is equal to but opposite from a depth-induced phase error that is present on the light that emerges from out-of-focus planes in the sample, As discussed above, these phase shifts can be applied as a result of the geometrical distortion in the grating pattern of the multi-focus grating. In some embodiments, the multi-focus gratings apply the phase shift to a first wavefront of the light of the first plurality of diffractive light beams and to a second wavefront of the light of the second plurality of diffractive light beams, where the first wavefront and the second wavefront have conjugate phase.

In an operation 320, the system simultaneously directs and focuses each of the first plurality of diffractive light beams and each of the second plurality of light beams onto different portions of an image plane of a detector. The detector can be an EMCCD detector as described herein. In an operation 325, based on the data received by the detector (i.e., the first and second plurality of diffracive light beams), the system generates one or more 3D image representations of the sample. The 3D image representations can each be compilations of 2D images representing the various depth planes within the sample.

Described below is a mathematical process to derive the iMFM point spread function (PSF) by assuming uniform excitation light at the sample. The derivation is an extension of single-objective MFM to the dual-objective iMFM. As an example, a single point source (0, 0, z) may be sandwiched between two opposing objectives, where z is the displacement of the point from the sample focal plane. Upon fluorescence emission, the first and second objective lenses can respectively produce complex wavefronts on the detector plane (x, y) as follows:

$$E_{1,iMFM}(x, y; 0, 0, z; \lambda) = \mathcal{F}\{g_1(x_g, y_g; \lambda) f_1(x_g, y_g; 0, 0, z; \lambda)\}, \quad \text{Eq. 1}$$

$$E_{2,iMFM}(x, y; 0, 0, z; \lambda) = \mathcal{F}\{g_2(x_g, y_g; \lambda)f_2(x_g, y_g; 0, 0, z; \lambda)\}, \quad \text{Eq. 2}$$

where (x, y) are spatial coordinates on the detector plane, $\lambda$ is the fluorescence emission wavelength, $\mathcal{F}$ denotes the 2D Fourier transform, $g_1$ and $g_2$ denote MFGs placed in the Fourier planes of the two objective lenses, respectively, with spatial coordinates of $(x_g, y_g)$, and $f_1$ and $f_2$ are complex wavefronts in the first and second objective Fourier plane caused by the point source (0, 0, z) propagation, respectively. Continuing the example, it can be shown that $\mathcal{F}\{f_1(x_g, y_g; 0, 0, z; \lambda)\} = p_1(x, y; 0, 0, z; \lambda)$ and $\mathcal{F}\{f_2(x_g, y_g; 0, 0, z; \lambda)\} = p_2(x, y; 0, 0, z; \lambda)$, where $p_1(x, y; 0, 0, z; \lambda)$ is the coherent spread function (CSF) of a point source (0, 0, z) in a single lens imaging under uniform illumination. This has the following form in the focal region of a high numerical aperture (NA) objective of circular aperture under the scalar and Debye approximations:

$$p_1(x, y; 0, 0, z; \lambda) = \quad \text{Eq. 3}$$

$$\frac{A}{\lambda}\int_0^{\alpha} \sin\theta\sqrt{\cos\theta}\exp(-ikz\cos\theta)J_0(k\rho(x,y)\sin\theta)d\theta,$$

where A is a constant, $\alpha = \sin^{-1}(NA/n_0)$ is the semi-aperture angle of the objective lens, in which $n_0$ is the index of refraction, $k = 2\pi n_0/\lambda$ is the wave number, $J_0$ is the zeroth order Bessel function of the first kind, and $\rho(x, y) = \sqrt{x^2+y^2}$ denotes the radial coordinate position on the detector plane. It is noted that $\sqrt{\cos\theta}$ is an apodization function for a high NA objective under Abbe sine condition. The CSF modeling with a low NA objective can be derived from Eq. 3 by further assuming the paraxial approximation. In dual-objective detection, there exists the following relationship:

$$p_2(x, y; 0, 0, z; \lambda) = p_1(x, y; 0, 0, -z; \lambda) \quad \text{Eq. 4}$$

because of opposite propagation directions of the emitted light into both the first and second objectives.

For monochromatic light, the detection intensity PSF is the square of the coherent addition of spherical wavefronts of two opposing objective lenses, expressed as:

$$h_{iMFM}^{mono}(x, y; 0, 0, z; \lambda) = |E_{1,iMFM}(x, y; 0, 0, z; \lambda) + E_{2,iMFM}(x, y; 0, 0, z; \lambda)|^2. \quad \text{Eq. 5}$$

As expected, if no MFGs are placed in the Fourier planes of the two objective lenses (which means $g_1$ and $g_2$ are all inside the circular pupil plane), Eq. 5 reduces to the detection PSF of I$^2$M or I$^5$M, which records interferometric information from one focal plane at a time, and then assembles a 3D interferometric stack from sequentially refocused 2D images.

In the iMFM configuration shown in FIG. 2A, the entire 3D interferometric focal stack can be recorded in a single shot by placing two MEGs of conjugate focal shifts in the Fourier planes of dual objectives. This is because the MFG can be designed to split the emitted beam into an array of (2M+1)×(2N+1) differently focused tiles on the detector at one exposure time, where M and N are design parameters of the system which determine the total number of the tiles. The focal shift property of the MFG is achieved by imposing a geometrical distortion on a regular periodic grating pattern (with periods $d_x$ and $d_y$ in the x and y directions, respectively) placed in the Fourier plane. This geometrical distortion in return introduces an order-dependent defocus phase shift in the detector plane. Mathematically, the MFG equation can be described as (see Appendix for more details):

$$\mathcal{F}\{g_1(x_g, y_g; \lambda)\} = \quad \text{Eq. 6}$$

$$\sum_{m=-M}^{M}\sum_{n=-N}^{N} w_{m,n}(\lambda)\exp\left(-ikz_{m,n}\frac{\lambda}{\lambda_c}\cos\theta\right)\delta\left(x - mx_0\frac{\lambda}{\lambda_c}, y - ny_0\frac{\lambda}{\lambda_c}\right),$$

$$\mathcal{F}\{g_2(x_g, y_g; \lambda)\} = \quad \text{Eq. 7}$$

$$\sum_{m=-M}^{M}\sum_{n=-N}^{N} w_{m,n}(\lambda)\exp\left(ikz_{m,n}\frac{\lambda}{\lambda_c}\cos\theta\right)\delta\left(x - mx_0\frac{\lambda}{\lambda_c}, y - ny_0\frac{\lambda}{\lambda_c}\right),$$

where $w_{m,n}^2$ is the diffraction efficiency of diffraction order (m, n) such that $$\sum_{m=-M}^{M}\sum_{n=-N}^{N} w_{m,n}^2 \le 1$$

is the total efficiency of MFG, $z_{m,n} = (m+Bn)\Delta z$ is a focal shift at diffraction order (m, n), in which $\Delta z$ is a predefined focal step between two adjacent focal planes and $B = 2M+1$, $\lambda_c$ is the central emission wavelength used for the MFG distortion calculation, $\delta(x, y)$ is a Dirac delta function, and $(mx_0, ny_0) = (mf_2\lambda_c/d_x, nf_2\lambda_c/d_y)$ is the center position of diffractive order (m, n) on the camera plane under the paraxial approximation for the emission wavelength $\lambda_c$. It is noted that the paraxial approximation holds here because the focal length $f_2$ of the relay system lens is much larger than the sensor size. The above equations indicate two distinct properties of the MFG, namely light path splitting into an array of (2M+1)×(2N+1) diffraction orders (or tiles) indicated by the Dirac delta function due to the periodic property of the MFG, and an order-dependent phase shift indicated by the exponential phase function due to the distortion of the MFG.

If the wavefront defocus phase from the out-of-focus plane (exp(ikz cos θ) as shown in Eq. 3) is compensated (or corrected) by the MFG order-dependent defocus phase (exp($-ikz_{m,n}$ cos θλ/λ$_c$), as shown in Eq. 3), it is possible to simultaneously focus the light originating from an in-focus plane and multiple out-of-focus planes onto distinct lateral diffraction orders, and therefore form multi-focus images on a single 2D camera within one exposure time. This is one of the principles of a single lens MFM system. In the dual-objective iMFM configuration, the light originating from the same emitted point source has conjugate phase after passing through two opposing objectives. Therefore, in order to diffract these two conjugate spherical wavefronts to the same diffraction order on the camera, two MFG $g_1$ and $g_2$ with conjugate focal shifts are placed in the Fourier planes in the iMEM microscope, as shown in FIG. 2A. In an alternative embodiment, the use of two phase masks to produce the correct interference between two coherent beams of light can be used.

According to the convolution theorem, by substituting Eq. (3-4, 6-7), Eqs. 1 and 2 become:

$$E_{1,iMFM}(x, y; 0, 0, z; \lambda)) = \quad \text{Eq. 8}$$

$$\sum_{m=-M}^{M}\sum_{n=-N}^{N} w_{m,n}(\lambda)p_1\left(x - mx_0\frac{\lambda}{\lambda_c}, y - ny_0\frac{\lambda}{\lambda_c}; 0, 0, z - z_{m,n}\frac{\lambda}{\lambda_c}\right),$$

$$E_{2,iMFM}(x, y; 0, 0, z; \lambda)) = \quad \text{Eq. 9}$$

$$\sum_{m=-M}^{M}\sum_{n=-N}^{N} w_{m,n}(\lambda)p_1\left(x - mx_0\frac{\lambda}{\lambda_c}, y - ny_0\frac{\lambda}{\lambda_c}; 0, 0, z_{m,n}\frac{\lambda}{\lambda_c} - z\right),$$

and Eq. (5) becomes $$h_{iMFM}^{mono}(x, y; 0, 0, z; \lambda) =$$  Eq. 10

$$\sum_{m=-M}^{M} \sum_{n=-N}^{N} h_{m,n}\left(x, y; 0, 0, z - z_{m,n}\frac{\lambda}{\lambda_c}\right), \text{ where}$$

$$h_{m,n}\left(x, y; 0, 0, z - z_{m,n}\frac{\lambda}{\lambda_c}\right) =$$  Eq. 11

$$w_{m,n}^2(\lambda) \left| \frac{\hat{M}}{f_{obj}^2 \lambda^2} \int_0^\alpha \left\{ \exp\left[ik\left(z - z_{m,n}\frac{\lambda}{\lambda_c}\right)\cos\theta\right] + \exp\left[ik\left(z_{m,n}\frac{\lambda}{\lambda_c} - z\right)\cos\theta\right]\right\} \times \sin\theta\sqrt{\cos\theta} \, J_0 \right.$$

$$\left. \left[\rho\left(x - mx_0\frac{\lambda}{\lambda_c}, y - ny_0\frac{\lambda}{\lambda_c}\right)\sin\theta\right] d\theta \right|^2,$$

is a tile-PSF at diffraction order (m, n).

The polychromatic intensity PSF is an integration of the monochromatic PSF over the emission spectrum $\Delta\lambda$:

$$h_{iMFM}^{poly}(x, y; 0, 0, z; \lambda) =$$  Eq. 12

$$\sum_{m=-M}^{M} \sum_{n=-N}^{N} \int_{\lambda_c - \Delta\lambda/2}^{\lambda_c + \Delta\lambda/2} h_{m,n}\left(x, y; 0, 0, z - z_{m,n}\frac{\lambda}{\lambda_c}\right) d\lambda.$$

Equations 10 and 12 are analytical formulations of the monochromatic and polychromatic PSFs of the dual-objective iMFM. They indicate that both monochromatic and polychromatic PSFs consist of multiple tile-PSFs. Each tile-PSF has a distinct focal plane of $z_{m,n}\lambda/\lambda_c$ for emission wavelength $\lambda$, and more importantly, features an axial interference pattern, which contains high frequencies and high resolution information.

Figure 4A:
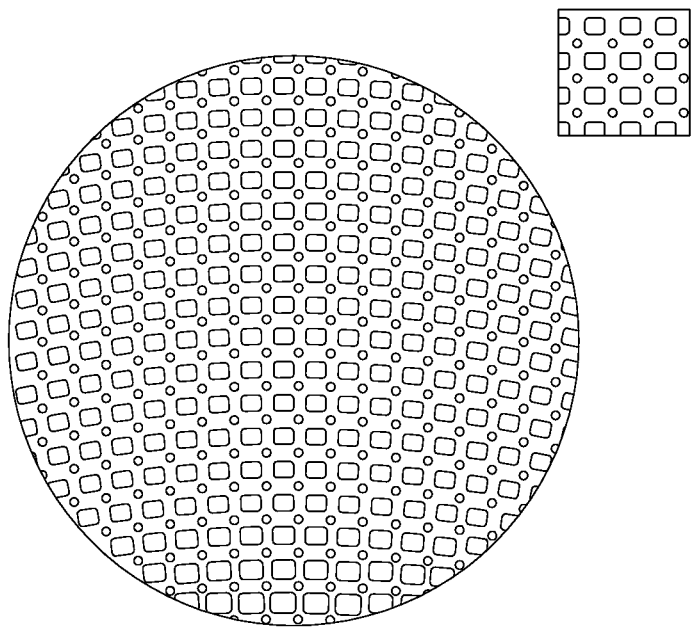
FIG. 4A depicts the first multi-focus grating with focal step $\Delta z=250$ nm in accordance with an illustrative embodiment.
Figure 4B:
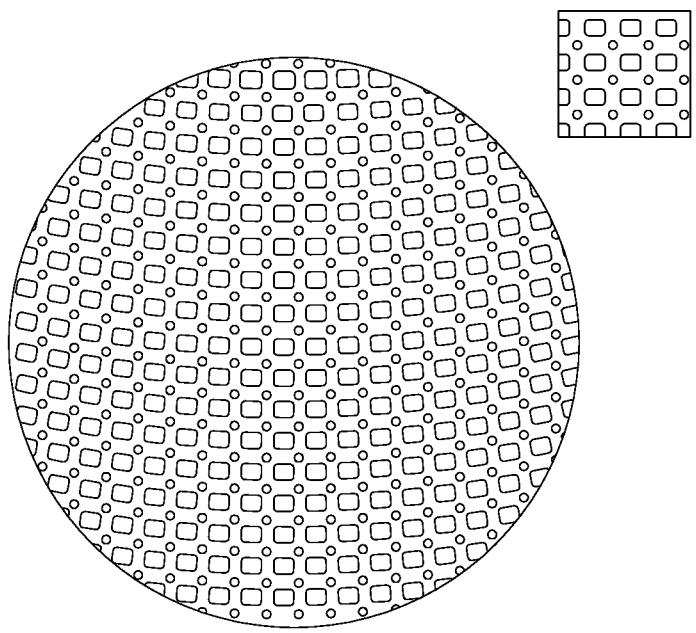
FIG. 4B depicts the second multi-focus grating with a focal step of $\Delta z=-250$ nm in accordance with an illustrative embodiment.

To verify the iMFM imaging system and make a practical comparison between MFM and iMFM PSFs, simulations wee conducted for the detection PSF for a numerical aperture NA=1.27 of water immersion objective, with refractive index of 1.338, magnification $\hat{M}$=60, and the emission central wavelength $\lambda_c$=620 nm. Based on these parameters, a first multi-focus grating (MFG1) was designed, which produces 3×3 focal shift images with a focal step of $\Delta z$=250 nm. FIG. 4A depicts the first multi-focus grating with focal step $\Delta z$=250 nm in accordance with an illustrative embodiment. The period of the first multi-focus grating is $d_x=d_y$=56 μm with a pixel size of 1 μm, and the diameter of MFG1 is set to be the same as that of the pupil aperture, defined by $2f_{obj}$NA=8467 μm. The unit cell pattern of MFG1 is optimized for a maximum diffraction efficiency by using the iterative Gerchberg-Saxton (GS) algorithm. As a result, the diffraction efficiency $w_{m,n}^2$ for each diffraction order is [7.13, 7.79, 7.01, 7.70, 8.57, 7.70, 7.01, 7.79, 7.13] percent with a total efficiency of 67.83%, which is close to the theoretical maximum efficiency. The geometric distortion is then imposed on MFG1 to create a proper focal step of $\Delta z$=250 nm between consecutive diffraction orders for the emission central wavelength $\lambda_c$. A second multi-focus grating (MFG2) with opposite focal shift was generated by rotating MFG1 by 180 degrees. FIG. 4B depicts the second multi-focus grating with a focal step of $\Delta z$=250 nm in accordance with an illustrative embodiment. In FIGS. 4A and 4B, the insets depict the central 400×400 pixels of the respective MFGs, which contain multiple grating unit cells.

Figure 5A:
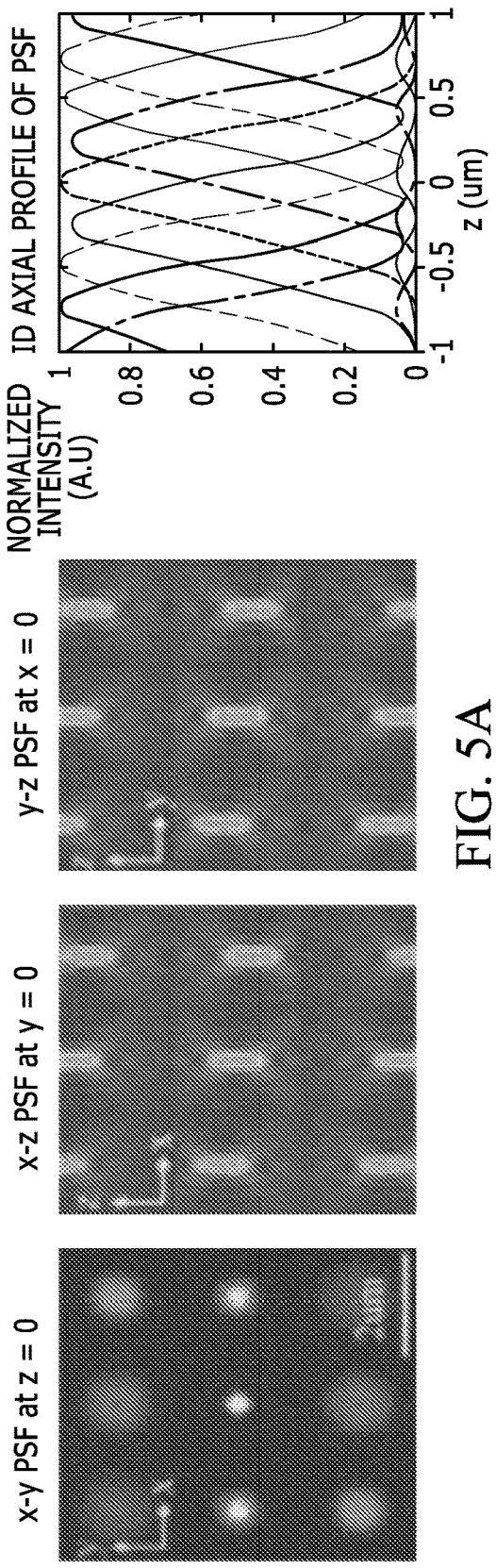
FIG. 5A depicts an xy cut, an xz cut, a yz cut, and an axial profile of each tile point spread function (PSF) for an MFM monochratnatic PSF in accordance with an illustrative embodiment.
Figure 5B:
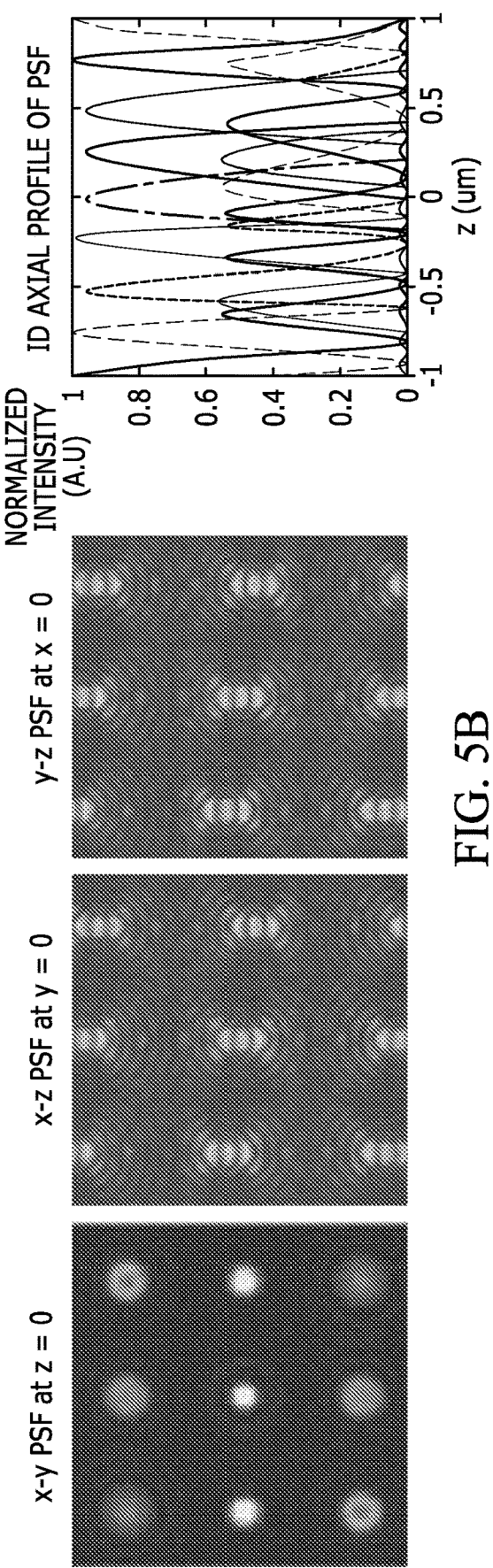
FIG. 5B depicts an xy cut, an xz cut, a yz cut, and an axial profile of each tile PSF for an iMFM monochramatic PSF in accordance with an illustrative embodiment.
Figure 5C:
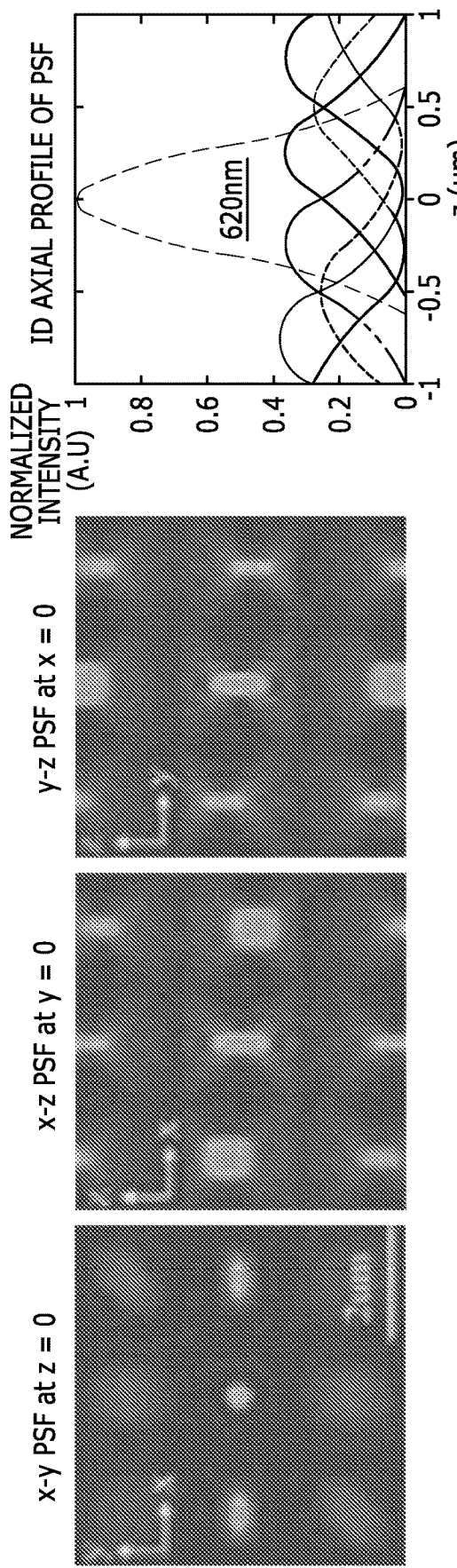
FIG. 5C depicts an xy cut, an xz cut, a yz cut, and an axial profile of each tile PSF for an MFM polychratnatic PSF in accordance with an illustrative embodiment.
Figure 5D:
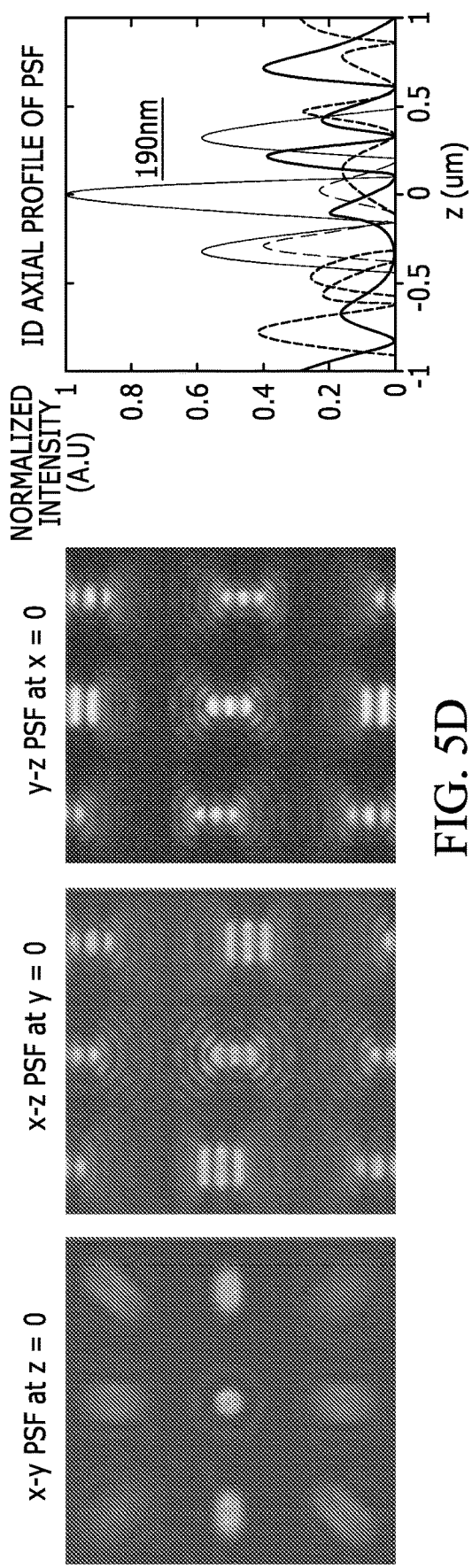
FIG. 5D depicts an xy cut, an xz cut, a yz cut, and an axial profile of each tile PSF for an iMFM polychromatic PSF in accordance with an illustrative embodiment.

Using the system with the designed MFGs (MFG1 and MFG2) depicted in FIG. 4, the detection PSFs were numerically simulated in the size of 1500×1500×200 voxels with the voxel size of 80 nm×80 nm×10 nm for both MFM and iMFM. The monochromatic unaberrated iMFM detection PSF is computed from Eq. 5 by setting $\lambda=\lambda_c$. For a polychromatic PSF in the presence of chromatic aberrations (CA), a 10 nm emission filter is considered and the PSF is computed by integrating Eq. 5 over the emission bandwidth of 10 nm. FIG. 5 depicts the xy, xz, yz cuts and 1D axial profile of monochromatic and polychromatic MFM and iMFM PSFs in accordance with an illustrative embodiment. Specifically, FIG. 5A depicts an xy cut, an xz cut, a yz cut, and an axial profile of each tile PSF for an MFM monochramatic PSF in accordance with an illustrative embodiment. FIG. 5B depicts an xy cut, an xz cut, a yz cut, and an axial profile of each tile PSF for an iMFM monochramatic PSF in accordance with an illustrative embodiment. FIG. 5C depicts an xy cut, an xz cut, a yz cut, and an axial profile of each tile PSF for an MFM polychramatic PSF in accordance with an illustrative embodiment. FIG. 5D depicts an xy cut, an xz cut, a yz cut, and an axial profile of each tile PSF for an iMFM polychramatic PSF in accordance with an illustrative embodiment.

FIG. 5 verifies that both monochromatic and polychromatic iMFM FM PSFs are composed of multiple focal shift interferometric tile-PSFs, as indicated by Eqs. 10 and 12, respectively. When CA exits, each non-central tile-PSF has a dispersion along the x and/or y directions, causing the peak intensity to become relatively lower, as shown in the 1D axial profile of FIGS. 5C and 5D. However, full width at half maximum (FWHM) along the z direction remains almost the same, with about 190 nm for iNIFM PSF and 620 nm for MFM PSF, with a 3.3-fold decrease of the diffraction spot size along the axial direction.

The proposed dual-objective iMFM features a single-shot multifocal interferometry detection, mapping multiple interferotnetric focal planes of a 3D sample volume o(x, y, z) simultaneously onto a 2D image plane I(x, y) in one exposure time without translating the sample. In this case, the recorded intensity is given by $$I(x, y) = \mathcal{P}\{\int_z o(x, y; z) * h_{iMFM}(x, y; z) dz + b\} + \hat{n},$$  Eq. 13 where $\mathcal{P}$ represents Poisson statistics originating from signal photons, * denotes the 2D convolution, $h_{iMFM}$ is the iMFM monochromatic or polychromatic PSF, b is homogeneous background noise, and $\hat{n}$ denotes additive Gaussian noise. For compaction, Equation 13 can also be written in a matrix-vector form as $$I = \mathcal{P}\{Ao + b\},$$  Eq. 14 where I is an $\mathcal{M} \times 1$ column vector, in which $\mathcal{M} = \mathcal{M}_x \mathcal{M}_y$ is the number of pixels of the recorded image, and o is an $\mathcal{N} \times 1$ column vector, in which $\mathcal{N} = \mathcal{N}_x \mathcal{N}_y \mathcal{N}_z$ is the number of voxels of the 3D unknown object to be recovered, and A is the sensing matrix of a size $\mathcal{M} \times \mathcal{N}$, computed from iMFM's normalized PSF $h_{iMFM}$, whose integral is equal to one. The additive Gaussian noise is ignored here for two reasons. First, MFM and iMFM are photon budget limited detection schemes because the emitted photons are split into multiple light paths in order to create proper refocus without overlapping, and thus, the Poisson noise dominates. Second, the read-out noise of an electron multiplying charge coupled device (EMCCD), which is commonly used in low light condition fluorescent imaging, is neglectable due to the high electron multiplying (EM) factor.

In order to take the Poisson noise into account and remove the out-of-focus blur, the Richardson-Lucy (R-L) deconvolution algorithm for iMFM 3D extended object recovery was used. To suppress noise amplification, total variation (TV) regularization is used. In addition, the non-negativity constraint is applied due to the non-negative nature of fluorescent light so as to restrict the set of possible solutions. These constraints are helpful when more 3D information from fewer 2D measurement data in MFM iss recovered, i.e., when $\mathcal{M} < \mathcal{N}$. In R-L deconvolution, the following optimization is performed:

$$\operatorname*{argmin}_{o} \sum_{p} \{-I(p)\log[(Ao+b)(p)] + (Ao+b)(p)\} + \lambda_{TV} TV(o) \qquad \text{Eq. 15}$$

$$\text{subject to } o \geq 0,$$

where p denotes the pixel coordinate in the captured image, $\lambda_{TV}$ is the regularization parameter, and $$TV(o) = \sum_{s} |\nabla o(s)|,$$

in which s denotes the voxel coordinate in the o. A solution to the optimization problem in Equation 15 can be found by the following iteration:

$$o_{k+1}(s) = \left\{ \left[ A^t \left( \frac{I}{A o_k + b} \right) \right](s) \right\} \frac{o_k(s)}{1 - \lambda_{TV} \operatorname{div}\left( \frac{\nabla o_k(s)}{|\nabla o_k(s)|} \right)}, \qquad \text{Eq. 16}$$

$$o_{k+1}(s) \geq 0,$$

where k denotes the iteration number, the divisions are element wise, $A^t$ is the transpose of A, and div stands for the divergence operator. The denominator of Equation 16 may become zero or negative due to a large value of $\lambda_{TV}$. To prevent this from happening, the negative values or 'not a number' (NAN) values were set to zero at each iteration step. The algorithm terminates, when the difference between two consecutive values of the cost function is smaller than a predefined threshold.

In single particle tracking, the 3D space includes a single point with varying 3D positions over time. The single point can be modeled as $o=\delta(\theta-\hat{\theta})=\delta(x-\hat{x}_0, y-\hat{y}_0, z-\hat{z}_0)$ and maximum likelihood estimation (MLE) can be used to recover its 3D position $\hat{\theta}=(\hat{x}_0, \hat{y}_0, \hat{z}_0)$. In MLE, the following optimization is performed:

$$\operatorname*{argmin}_{\theta} \sum_{p} \{-I(p)\log[(h_{iMFM}(\theta)+b)(p)] + (h_{iMFM}(\theta)+b)(p)\}. \qquad \text{Eq. 17}$$

Equation was minimized using the interior-point method of Matlab fmincon function. Alternatively, a different minimization algorithm may be used. It should be noted that the optimization problem in Equation 17 for MLE localization is non-convex, and therefore it is sensitive to the initial point. To improve the accuracy of MLE, a method is described below to determine the initial axial position of the single point that is imaged by the iMFM microscope.

A Fisher information matrix (FIM) measures the sensitivity of an observation (e.g., iMFM PSF) to changes of the parameters to be estimated (e.g., 3D position of a single molecule). The model for calculating the FIM for iMFM is the same as that for MFM. For each tile image, the photon detection is an independent Poisson process. Therefore, the total FIM of an iMFM PSF is the sum of the FIM for each tile PSF and can be expressed as a 3×3 matrix, as follows:

$$F = \begin{bmatrix} F_{xx}, & F_{xy}, & F_{xz} \\ F_{yx}, & F_{yy}, & F_{yz} \\ F_{zx}, & F_{zy}, & F_{zz} \end{bmatrix}, \qquad \text{Eq. 18}$$

where each entry of the matrix is $$F_{ij} = \sum_{m=-M}^{M} \sum_{n=-N}^{N} \sum_{p=1}^{N_p} \frac{N_{m,n}^2}{N_{m,n}\hat{h}_{m,n}(p)+b} \frac{\partial \hat{h}_{m,n}(p)}{\partial i} \frac{\partial \hat{h}_{m,n}(p)}{\partial j}, \qquad \text{Eq. 19}$$

in which $i,j \in [x, y, z]$, $N_p$ is the number of pixels for each tile image, b is the homogeneous background photons per pixel, $\hat{h}_{m,n}(p)$ is a normalized tile-PSF at diffraction order (m, n), and $M_{m,n} = w_{m,n}^2 2N_{tot}\gamma$ denotes the number of photons collected by the tile-PSF, where $N_{tot}$ denotes the total number of photons collected by each objective lens and $\gamma=0.5$ denotes the photon loss ratio at the beam splitter (BS). Then the Cramer-Rao lower bound (CRLB), which bounds the variance of the localization estimation $\sigma^2$, can be calculated by taking the diagonal elements of the inverse of the FIM as:

$$\begin{bmatrix} CRLB_x \\ CRLB_y \\ CRLB_z \end{bmatrix} = \begin{bmatrix} \sigma_x^2 \\ \sigma_y^2 \\ \sigma_z^2 \end{bmatrix} = \operatorname{Diag}(F^{-1}). \qquad \text{Eq. 20}$$

Figure 6A:
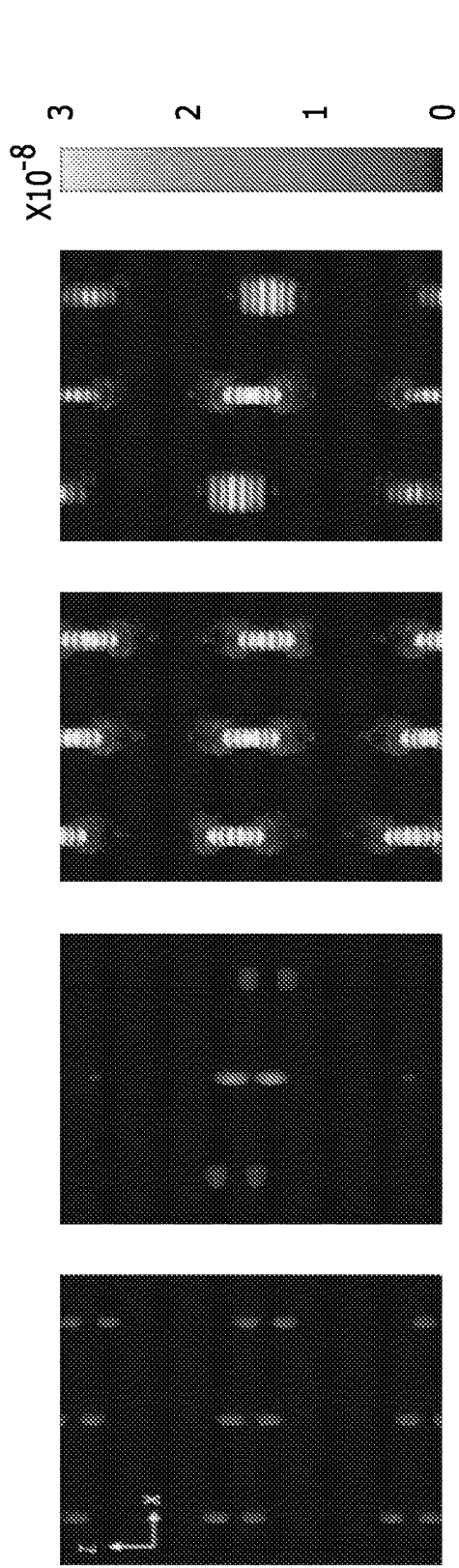
FIG. 6A depicts xz cuts of the square of the z-derivative for MEM monochromatic PSF (left), MFM polychromatic PSF (middle left), iMFM monochromatic PSF (middle right), and iMFM polychromatic PSF (right) in accordance with an illustrative embodiment.
Figure 6B:
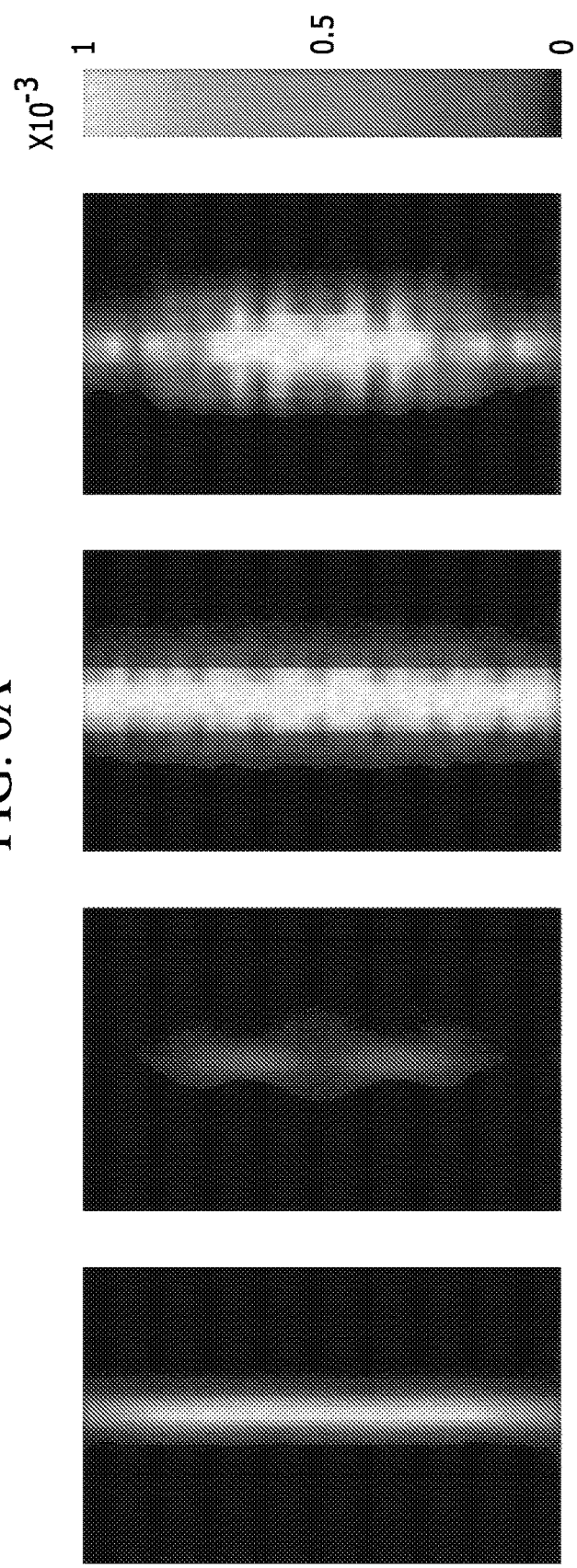
FIG. 6B depicts xz cuts of the combined z-derivative summed over 3×3 tiles in FIG. 6A in accordacne with an illustrative embodiment.

It can be seen from Equation 19 that the Fisher information or the localization precision can be improved by increasing the derivative of the PSF, i.e., $\partial \hat{h}_{m,n}/\partial i$. In the dual-objective iMFM, each tile-PSF has a higher z-derivative due to its axial features of in the interference pattern, and therefore a higher axial differential information content, causing 3 to 4-fold improvement along axial localization compared with single lens MFM. In addition, the simultaneous multifocal detection of iMFM leads to almost uniformly high combined differential information content along the large depth range, while conventional dual-objective detection in a single channel suffers from non-uniform localization along z due to zero z-derivative at its PSF intensity nodes. FIG. 6 shows xz-cuts of the square of z-derivative of the normalized MFM and iMFM PSFs. Specifically, FIG. 6A depicts xz cuts of the square of the z-derivative for MFM monochromatic PSF (left), MFM polychromatic PSF (middle left), iMFM monochromatic PSF (middle right), and iMFM polychromatic PSF (right) in accordance with an illustrative embodiment. As shown, the z-derivative is higher for the dual objective iMFM detection due to the steepended axial features of interferometric iMFM PSF. FIG. 6B depicts xz cuts of the combined z-derivative summed over 3×3 tiles in FIG. 6A in accordacne with an illustrative embodiment. As shown, the combination of 9 tiles leads to almost uniformly high infomration content along the optical axis.

Figure 7A:
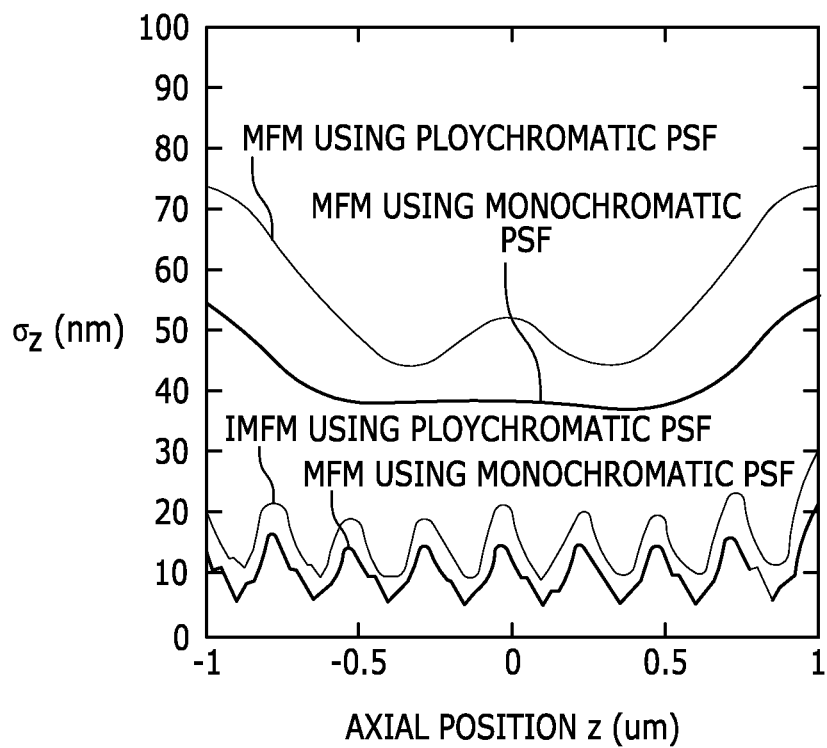
FIG. 7A depicts theoretical axial localization precision $\sigma_z$ for abberated and unaberrated detection schemes using the proposed iMFM and abberated and unaberrated detection schemes using an MFM system in accordance with an illustrative embodiment.
Figure 7B:
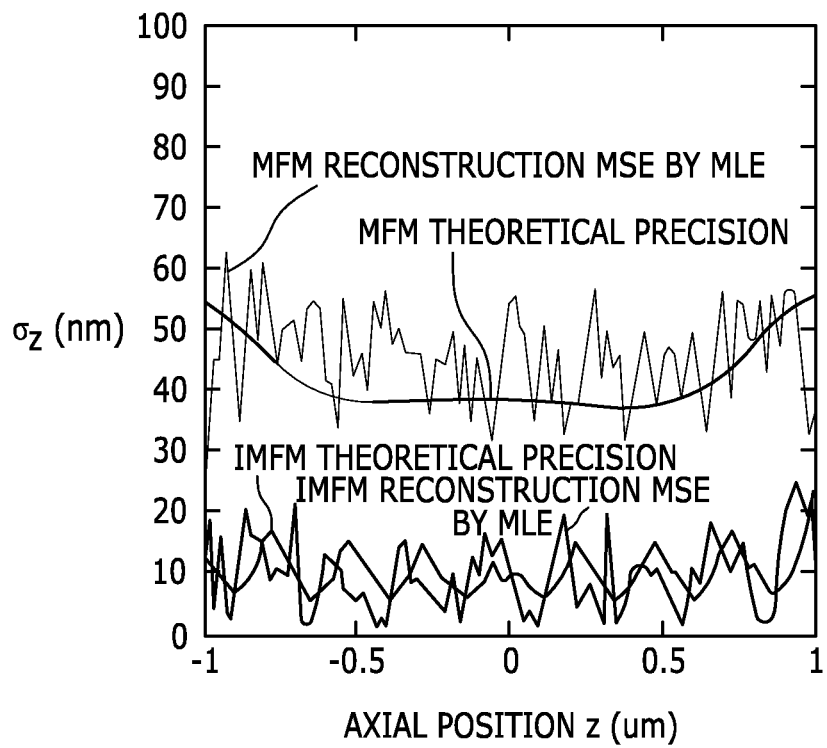
FIG. 7B depicts the mean squared error of the z position determined during 50 simulated localizations per individual axial value for MFM and iMFM and corresponding theoretical predictions in accordance with an illustrative embodiment.

According to Equation 19, the resolution can also be improved by increasing the number of the collected photons, i.e., $N_{m,n}$. The dual-objective detection collects twice the number of photons compared with single lens imaging, and therefore improves the resolution by a factor of $\sqrt{2}$ in all three dimensions when the background photon b is small. However, the light efficiency of the dual-objective iMFM configuration shown in FIG. 2A is similar to that of single objective MFM in that there is a factor of two light loss in the BS. To avoid the light loss, a second camera can be introduced and placed at the output of the BS. The axial resolution improvement is demonstrated in FIG. 7A, which is a plot of the theoretical localization precision $\sigma_z$ along a 2 µm axial range calculated from Equations 19 and 20. More specifically, FIG. 7A depicts theoretical axial localization precision $\sigma_z$ for abberated and unaberrated detection schemes using the proposed iMFM and abberated and unaberrated detection schemes using an MFM system in accordance with an illustrative embodiment. For the calculation, 2500 detected signal photons per objective lens and 10 background photons per pixel were considered. FIG. 7B depicts the mean squared error of the z position determined during 50 simulated localizations per individual axial value for MFM and iMFM and corresponding theoretical predictions in accordance with an illustrative embodiment.

In the calculation, $N_{tot}$=2500 detected signal photons per objective lens and b=10 background photons per pixel werere considered, which are typical values observed in single molecule experiments. The parameter values of the microscope and MFG are set to be the same as those when the PSF was simulated, as described above. The results suggest that the monochromatic iMFM PSF provides an average theoretical localization precision of $(\sigma_x, \sigma_y, \sigma_z)$= (16.6 nm, 16.6 nm, 11.2 nm) over the imaging range of 2 µm for 2500 signal photons and 10 background photons. Compared to the single lens monochromatic MFM PSF with localization precision of (18.0 nm ,18.0 nm, 44.8 nm), the lateral localization precision $\sqrt{\sigma_x \sigma_y}$ is increased by a factor of 0.08 (this small gain results from the redistribution of the light due to the interference), and the axial one by a factor of 4. When chromatic aberration exists in the presence of a 10 nm emission spectrum, both MFM and iMFM localization precisions decrease. An iMFM polychromatic PSF can achieve average localization precision of $(\sigma_x, \sigma_y, \sigma_z)$=(25.6 nm, 24.0 nm, 16.6 nm), with 1.17-fold improvement laterally and 3.6-fold improvement axially compared to MFM polychromatic PSF of localization precision (29.9 nm, 28.3 nm, 59.7 nm). The localization precision is slightly different in the x and y directions for polychromatic aberrated PSFs. This is because the light diffraction efficiency is different for horizontal and vertical diffraction orders of the designed MFG. Those results indicate that iNIFM could provide 3 to 4-fold improved axial localization precision in both aberrated and unaberrated systems.

In order to verify the theoretical analysis discussed above and demonstrate the capability of iMFM to achieve higher axial localization precision, MLE reconstructions of single particle tracking using iMFM multifocal interferometric detection were performed. However, it is known that the optimization problem in MLE as shown in Equation is non-convex, and a global minimal is not guaranteed to be found. Therefore, multiple random initial values are used for the MLE localization algorithm, and the optimal solution with the minimal cost function values is picked as the final reconstruction.

A better initial value closer to the global minimal than random initial values could improve the success and convergence of the MLE localization algorithm, but it is difficult to determine since there is no prior information about the 3D position of the point in conventional microscopy imaging. In addition, it is impossible to tell whether the point is in the positive or negative defocus because the PSF is symmetric with respect to the focal plane and has the same blur size for equal magnitude but opposite defocus.

Described below is a method to determine an initial axial position of the single point that is imaged by the MFM and iMFM microscopes. In MFM and iMFM, the PSF is not symmetric any more due to the multi-focusing property. Furthermore, each z position point is focused in different tiles, expressed as $z=(m+Bn)\Delta z$, where (m, n) is the focused tile diffraction order, and B and $\Delta z$ are the pre-designed parameters which are known a priori. Therefore, if one can determine which tile image is most in focus by comparing the blur sizes of the tile-PSFs, then the initial axial position of the molecule $z_0$ can be found as $z_0=(m+Bn)\Delta z$. Also, since the focal step between two consecutive tiles is $\Delta z$, the error distance between the initial estimation and the ground truth should be smaller than $\Delta z$, i.e., $|z_0-\hat{z}| \leq \Delta z$. In the simulation, $|z_0-\hat{z}| \leq 2\Delta z$ was used in order to preserve both accuracy and speed of the MLE localization algorithm.

Figure 8:
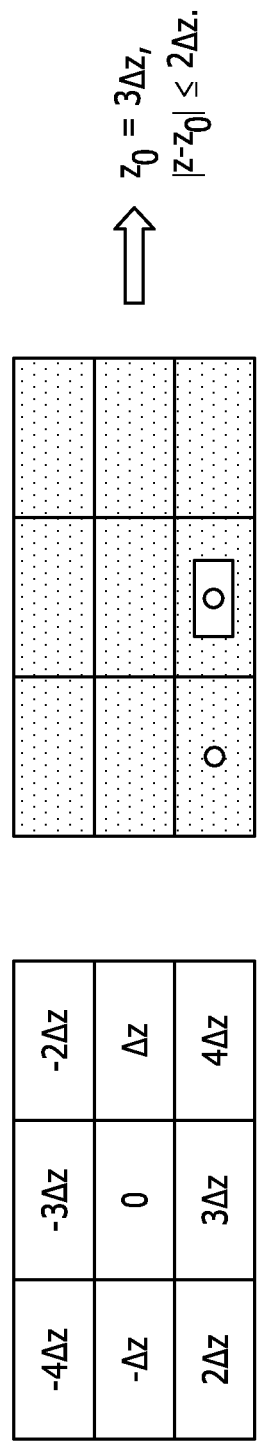
FIG. 8 depicts an example of determining the initial axial position and range of a single point for an MLE localization algorithm in iMFM in accordance with an illustrative embodiment.

FIG. 8 depicts an example of determining the initial axial position and range of a single point for an MLE localization algorithm in iMFM in accordance with an illustrative embodiment. In the simulation, Ntot=2500 total detected signal photons and b=10 background photons per pixel were considered. In FIG. 8, the left tile depicts the focal shift of the MFG as known a priori, the right tile depicts the simulated iNIFM image of a single point, and the relationships on the right are the initial axial position and range estimations.

It is known that for each position $(\hat{x}_0, \hat{y}_0, \hat{z}_0)$ of the molecule emitter, the acquired pixelated image under Poisson noise corruption is generated as $$I(x, y; \hat{x}_0, \hat{y}_0, \hat{z}_0) = \mathcal{P}[N_{tot} \iint_{C_p} \hat{h}_{iMFM}(x-\hat{x}_0, y-\hat{y}_0; \hat{z}_0)dxdy+b], \quad \text{Eq. 21}$$

where $C_p$ denotes the pixel area on the detector plane, $\hat{h}_{iMFM}$ is the normalized iMFM PSF with its integral equal to one, and $N_{tot}$ is the total number of the photons collected by the iMFM PSF. The microscope and MFG parameters were the same as those used for PSF simulation and CRLB calculation described above. The acquired image I was 3×3 tile images with a focal shift of $\Delta z$=0.25 µm. It was assumed that each tile image had a region of interest (ROI) of 41×41 pixels, with a pixel size of 4 µm×4 µm. In addition, each pixel was composed of 4×4 sub-pixels for the purpose of the integral over the pixel area $C_p$.

Figure 9A:
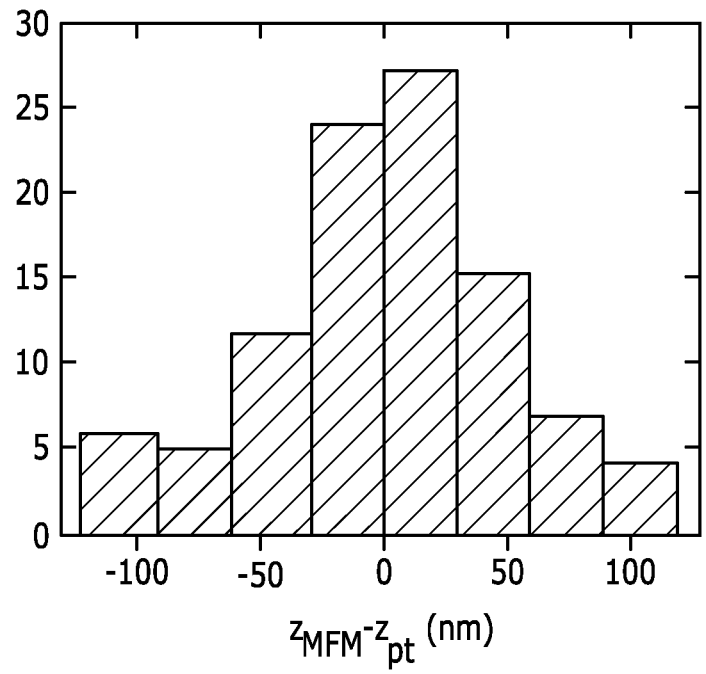
FIG. 9A depicts a histogram of axial residuals between ground truth and MFM recovery in accordacne with an illustrative embodiment.
Figure 9B:
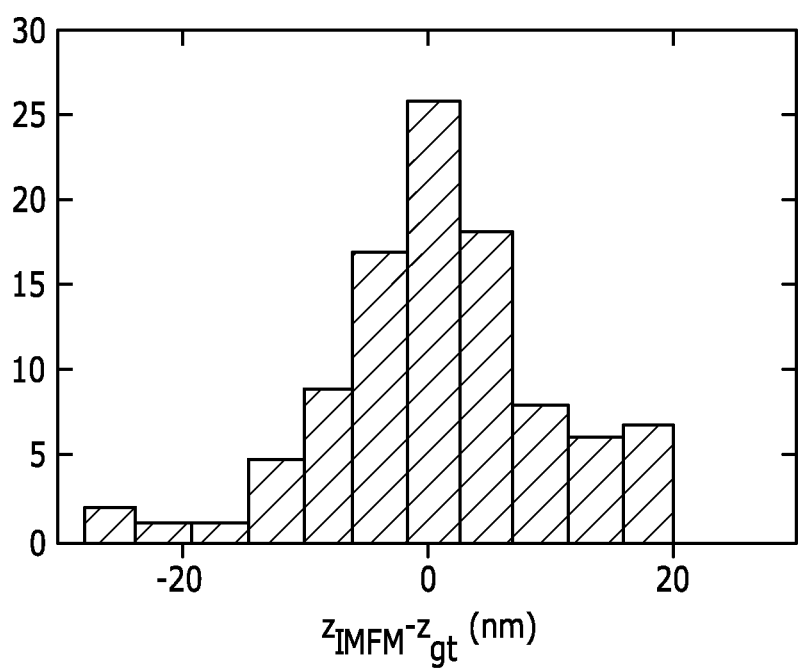
FIG. 9B depicts a historgram of axial residuals between ground truth and iMFM recovery in accordance with an illustrative embodiment.

Starting with a proper initial value as described above, 50 images for each z position of the emitter between −1 µm and 1 µm from Equation 21 were simulated and MLE was used to back-calculate the 3D position of the emitter. For each 3D position, a cluster of the positions containing 50 points was recovered and the mean squared error between estimated position and true position was calculated. The estimation errors in the axial dimension by both MFM and iMFM are shown in FIG. 7B. The simulation results indicate that the MLE estimation errors are well consistent with theoretical predictions. A trajectory of a single emitter which follows a random walk from −1 µm toward 1 µm were also simulated, and plotted in 3D view along with its projections onto the xy, xz and yz planes. The MFM and iMFM reconstructed trajectories were also plotted. The difference between the ground truth and reconstructions along the axial direction is also plotted as a histogram of axial residuals. FIG. 9A depicts a histogram of axial residuals between ground truth and MFM recovery in accordance with an illustrative embodiment. FIG. 9B depicts a histogram of axial residuals between ground truth and iMFM recovery in accordance with an illustrative embodiment. The standard deviation for MFM is 48.37 nm and standard deviation for iMFM is 12.12 nm, resulting in a 4-fold boost in axial localization precision that iMFM detection PSF can offer over a large volume.

Described below is isotropica 3D resolution for iMFM wide field imaging. For a band-limited system, the Nyquist sampling rate has to be satisfied in order to avoid aliasing. In the dual-objective iMFM microscope, the lateral cut-off frequency is $2NA/\lambda$ and the axial cut-off frequency is $2\hat{n}/\lambda$. Therefore, the Nyquist sampling distance in the sample space has to be equal or less than $\Delta_{xy}=\lambda/(4NA)$ in the lateral direction and $\Delta_z=\lambda/(4\hat{n})$ in the axial direction.

For an iMFM system with NA=1.27, index of the refraction $\hat{n}=1.338$ and $\lambda=620$ nm, it was found that $\Delta_{xy}=122$ nm and $\Delta_z=116$ nm. In the microscope design, the lateral sampling distance can be met by choosing a camera with proper pixel size such that $d_{pixel}/\hat{M} \leq \Delta_{xy}$, and the axial sampling distance can be met by designing the MFG with a focal step $|\Delta z| \leq \Delta_z$.

To confirm that iMFM provides axial super-resolution and hence 3D isotropic resolution in the wide field fluorescence imaging, imaging of a 3D synthetic extended object was also performed. The same parameter values for the microscope were used: NA=1.27 with index of refraction 1.338, and magnification $\hat{M}=100$. In order to record more than 9 focal images in a single shot, a new MFG that produces an array of 5×5 focal shift images was designed. The focal step was designed to be $\Delta z=100$ nm in order to satisfy the Nyquist-Shannon sampling condition along z. The sensor size is assumed to be 1024×1024 pixels, with pixel size of 12 µm×12 µm. The size of each focal shift tile image is about 205×205 pixels. To avoid lateral convolution artifacts at the boundary, the lateral field of view (FOV) of a 3D synthetic extended object is confined to a central part of 129×129 pixels. The 3D synthetic object resembled the structure of microtubes, and is of size 129×129×49 voxels where each voxel size is 120 nm×120 nm×50 nm.

The single shot 2D measurements for iMFM and MFM were simulated using Equation 13. To simulate a microscope with chromatic aberrations (CA), the emission bandwidth of 10 nm was considered by using a 10 nm filter. The maximum number of photons detected by the brightest pixel was 500, and the corresponding Poisson noise was added in each measurement. For the reconstruction, the Richardson-Lucy algorithm with total variation (TV) regularization was used, as discussed above. The optimal regularization parameters were found by exhaustive search and the algorithm was run to converge, when the difference between two consecutive values of the cost function is smaller than a predefined threshold.

Figures 10C, 10D:
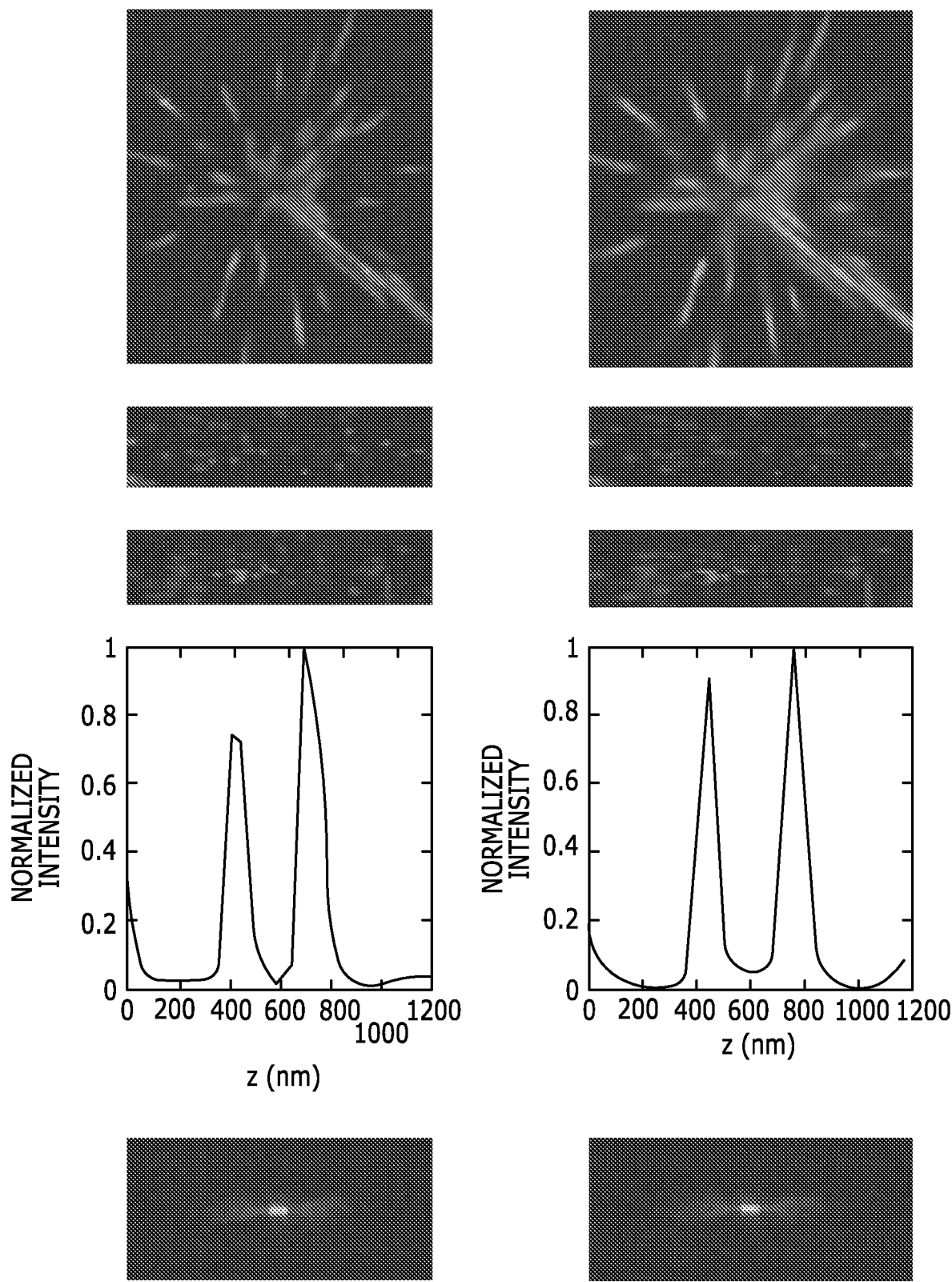
FIG. 10C depicts recovery of the 3D extended test object using unaberrated iMFM in accordance with an illustrative embodiment.
FIG. 10D depicts recovery of the 3D extended test object using aberrated iMFM in the presence of chromatic aberrations in accordance with an illustrativ embodiment.

FIG. 10A depicts the 3D extended test object in accordance with an illustrative embodiment. FIG. 10B depicts recovery of the 3D extended test object using MFM in accordance with an illustrative embodiment. FIG. 10C depicts recovery of the 3D extended test object using unaberrated iMFM in accordance with an illustrative embodiment. FIG. 10D depicts recovery of the 3D extended test object using aberrated iMFM in the presence of CA in accordance with an illustrative embodiment. In each of FIGS. 10A-10D, the first row depicts a 3D image in an xy slice, the second row depicts a first xz slice, the third row depicts a second xz slice, the fourth row depicts a comparison of linecuts and spectra between the ground truth, MFM, and iMFM reconstructions, and the bottom row depics the comparisin of $k_z k_x$ spectra by Fourier transformation of the reconstructions. The depicted results demonstrate that both aberrated and unaberrated iMFM can receover higher axial spatial frequencies beyond the detection cut-off of the single lens MFM system, and can therefore achieve super-resolution in the axial direction even for a system with chromatic aberrations. As shown in FIG. 10B, two axial finer features separated by approximately 375 nm axially are blurred to a single feature in the MFM reconstruction. However, these features are well resolved by both unaberrated and aberrated iMFM reconstructions as shown in FIGS. 10C and 10D.

Included below are the derivation details of the multifocus grating (MEG) equation (i.e., Equation 6). A normal periodic grating g with spacing $d_x$ and $d_y$ in the x and y directions, respectively, was considered. Because the grating is periodic and continuous, the Fourier transform (FT) of it yields a discrete and aperiodic spectrum as follows:

$$\mathcal{F}\{g(x_g, y_g; \lambda)\} = \sum_{m=-M}^{M} \sum_{n=-N}^{N} (\lambda)\delta(u - mu_0, v - nv_0),  \quad \text{Eq. 22}$$

where u and v are spatial frequencies in the x and y directions, respectively, and $u_0=1/d_x$ and $v_0=1/d_y$ are the intervals between consecutive samples in the discrete spectrum of the grating, In Fourier optics, $u=x/(f\lambda)$ and $v=y/(f\lambda)$ under the paraxial approximation, where x and y are spatial coordinates in the detection plane. It is noted that paraxial approximation holds here because the focal length f of the relay system lens is much larger than the sensor size.

For MFG, the geometrical distortions $\Delta_x$ and $\Delta_y$ are introduced in the grating pattern in the x and y directions, respectively. Therefore, according to the FT shift theorem, the FT of the distorted grating $g_1$ can be written as $$\mathcal{F}\{g_1(x_g, y_g; \lambda)\} = \quad \text{Eq. 23}$$

$$\mathcal{F}\{g(x_g - \Delta_x, y_g - \Delta_y; \lambda)\} = \sum_{m=-M}^{M} \sum_{n=-N}^{N} w_{m,n}(\lambda)\exp[-i2\pi(mu_0\Delta_x + nv_0\Delta_y)]\delta(u - mu_0, v - nv_0).$$

In Equation 23, the geometrical distortions are set to be $\Delta_x=d_x n_0 \Delta z \cos\theta/\lambda_c$ and $\Delta_y=Bd_y n_0 \Delta z \cos\theta/\lambda_c$ to create a proper refocus. Therefore, Equation 23 can be rewritten as $$\mathcal{F}\{g_1(x_g, y_g; \lambda)\} = \quad \text{Eq. 24}$$

$$\sum_{m=-M}^{M} \sum_{n=-N}^{N} w_{m,n}(\lambda)\exp\left(-ikz_{m,n}\frac{\lambda}{\lambda_c}\cos\theta\right)\delta\left(x - mx_0\frac{\lambda}{\lambda_c}, y - ny_0\frac{\lambda}{\lambda_c}\right),$$

where $k=2\pi n_0/\lambda$, $z_{m,n}=(m+Bn)\Delta z$, and $x_0=f\lambda_c/d_x$ and $y_0=\lambda_c/d_y$ are spatial intervals between consecutive diffraction orders in the x and y directions, respectively on the detector plane for the emission central wavelength $\lambda_c$. A variation of Equation 24 for the opposite focal shift MFG can also be derived in the similar way by setting the distortion to be $-\Delta_x$ and $-\Delta_y$ in the two directions.

Figure 11:
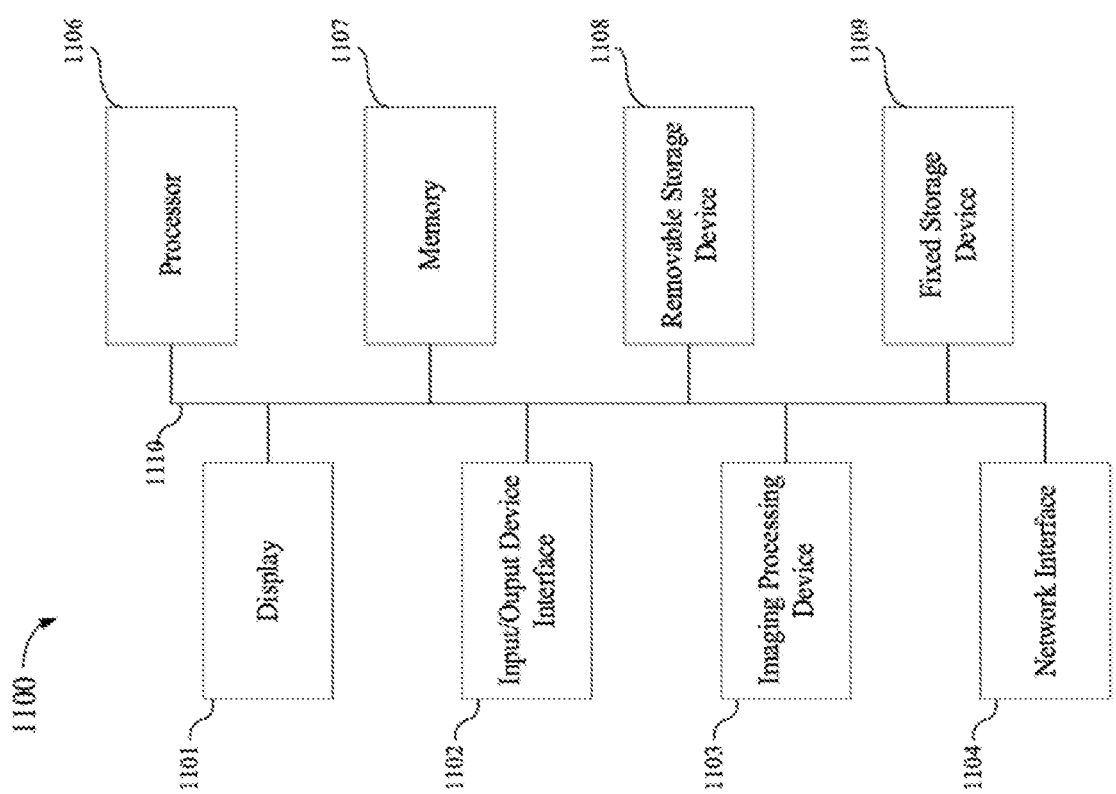
FIG. 11 is a block diagram illustrating a programmed computer system for an interferometric multifocus microscopy imaging system in accordance with an illustrative embodiment.

FIG. 11 is a block diagram illustrating a programmed computer system for an interferometric multifocus microscopy imaging system in accordance with an illustrative embodimedn. In alternative embodiments, other computer system architectures, configurations, and/or components can be used to perform the described imaging techniques. The computer system 1100, which includes various subsystems as described below, includes at least one processor 1106 (also referred to as a microprocessor or a central processing unit (CPU)). The processor 1106 can be implemented by a single-chip processor or by multiple processors. In some embodiments, the processor 1106 is a general purpose digital processor that controls the operation of the computer system 1100. The processor 1106 can also include one or more coprocessors or special purpose processors (e.g., a graphics processor, a network processor, etc.). Using instructions retrieved from a memory 1107, the processor 1106 controls the reception and manipulation of input data received on an input device (e.g., image processing, device 1103, I/O device interface 1102, etc.), and the output and display of data on output devices such as a display 1101.

The processor 1106 is coupled bi-directionally with the memory 107, which can include, for example, one or more random access memories (RAMs) and/or one or more read-only memories (ROMs). As is well known in the art, the memory 1107 can be used as a general storage area, a temporary (e.g., scratch pad) memory, and/or a cache memory. The memory 1107 can also be used to store input data and processed data, as well as to store programming instructions and data, in the form of data objects and text objects, in addition to other data and instructions for processes operating on the processor 1106. The memory 1107 can also be used to store basic operating instructions, program code, data, and objects used by the processor 1106 to perform its functions (e.g., programmed instructions). For example, the memory 1107 can include any suitable computer-readable storage media that stores computer-readable instructions that are executed by the processor 1106. The processor 1106 can also directly and rapidly retrieve and store frequently needed data in a cache memory included in the memory 1107.

A removable storage device 1108 provides additional data storage capacity for the computer system 1100, and is optionally coupled either bi-directionally (read/write) or uni-directionally (read-only) to the processor 1106. A fixed storage device 1109 can also, for example, provide additional data storage capacity. For example, the storage devices 1108 and/or 1109 can include computer-readable media such as magnetic tape, flash memory, PC-cards, portable mass storage devices such as hard drives (e.g., magnetic, optical, or solid state drives), holographic storage devices, and other storage devices. Mass storages 1108 and/or 1109 generally store additional programming instructions, data, and the like that typically are not in active use by the processor 1106. It will be appreciated that the information retained within mass storages 1108 and 1109 can be incorporated, if needed, in standard fashion as part of the memory 1107 (e.g., RAM) as virtual memory.

In addition, a bus 1110 to connects the various system components and provides the processor 1106 access to storage subsystems. The bus 1110 can also be used to provide access to other subsystems and devices as well. As shown, these can include the display 1101, a network interface 1104, an input/output (I/O) device interface 1102, the image processing device 1103, as well as other subsystems and devices. The image processing device 1103 can include an iMFM system, a camera, a scanner, etc. The I/O device interface 1102 can include a device interface for interacting with a touchscreen (e.g., a capacitive touch sensitive screen that supports gesture, interpretation, a microphone, a sound card, a speaker, a keyboard, a pointing device (e.g., a mouse, a stylus, a human finger), a Global Positioning System (GPS) receiver, an accelerometer, and/or any other appropriate device interface for interacting with the computing system 1100. Multiple I/O device interface can be used in conjunction with the computer system 1100. The I/O device interface can include general and customized interfaces that allow the processor 1106 to send and more typically, receive data from other devices such as keyboards, pointing devices, imaging systems, microphones, touch-screens, transducer card readers, tape readers, voice or handwriting recognizers, biometrics readers, cameras, portable mass storage devices, and other computers.

The network interface 1101 allows the processor 1106 to be coupled to another computer, computer network, or telecommunications network using a network connection as shown. For example, through the network interface 1104, the processor 1106 can receive information (e.g., data objects or program instructions) from another network, or output information to another network in the course of per any of the operations described herein. Information, often represented as a sequence of instructions to be executed on the processor, can be received from and outputted to another network. An interface card or similar device and appropriate software implemented by (e.g., executed/performed on) the processor 1100 can be used to connect the computer system 1100 to an external network and transfer data according to standard protocols. For example, various process embodiments disclosed herein can be executed on the processor 1106 or can be performed across a network such as the Internet, intranet networks, or local area networks, in conjunction with a remote processor that shares a portion of the processing.

In addition, various embodiments disclosed herein further relate to computer storage products with a computer-readable medium that includes program code for performing various computer-implemented operations. The computer-readable medium includes any data storage device that can store data which can thereafter be read by a computer system. Examples of computer-readable media include, but are not limited to: magnetic media such as disks and magnetic tape; optical media such as CD-ROM disks; magnetic-optical media such as optical disks; and specially configured hardware devices such as application-specific integrated circuits (ASICs), program matde logic devices (PLDs), and ROM and RAM devices. Examples of program code include both machine code as produced, for example, by a compiler, or files containing higher level code (e.g., script) that can be executed using an interpreter.

The computer system shown in FIG. 11 is but an example of a computer system suitable for use with the various embodiments disclosed herein. Other computer systems suitable for such use can include additional or fewer subsystems. In some computer systems, subsystems can share components (e.g., for touchscreen-based devices such as smartphones, tablets, etc., I/O device interface 1102 and display 1101 share the touch-sensitive screen component, which both detects user inputs and displays outputs to the user). In addition, the bus 1100 is illustrative of any interconnection scheme known in the art that serves to link the subsystems. Other computer architectures having different configurations of subsystems can also be utilized.

In summary, described herein is an interferometric multifocus microscopy (iMFM) imaging system. The iMFM imaging system takes advantage of multifocus microscopy (MFM) and the configuration with two opposing objective lenses. The iMFM imaging system provides a higher axial resolution and hence isotropic 3D resolution in a single shot. This disclosure also presents results from examining the problem of combining I²M and MFM. The new iMFM framework disclosed herein addresses the problem by employing two diffractive optical elements of opposite focal steps in the Fourier planes. In this configuration, the emitted light from the same point source can be directed into the same tile on the detector, and therefore self-interfere after passing through two lenses. The mathematical formulations of iMFM monochromatic and polychromatic PSFs were derived and the image formation models were given. The iMFM PSFs were simulated to show that this new iMFM configuration is capable of recording multiple focal shift interferometry in a single exposure without focal scanning, significantly speeding up the acquisition process of conventional detection.

Moreover, two applications of the disclosed iMFM imaging system were demonstrated: (i) single molecule tracking and (ii) wide field 3D extended object imaging. The Fisher information matrix (FIM) and the Cramér-Rao lower bound (CRLB) of iMFM for both monochromatic and polychromatic PSFs were calculated. The results show that the iMFM PSF contains almost uniformly high combined differential information content along the optic axis due to the steepened axial features of interferometry and the simultaneous multifocal detection scheme, proving that the iMFM PSF is more effective for encoding a single point position than MFM PSF. For 2500 detected photons per objective, a background of 10 photons per pixel, MFCTs of 3×3 tiles with a focal step of 0.25 μm and a total efficiency of 67%, and a single camera detection, which are typical conditions and values in practice, the theoretical localization precision of (16.6 nm, 16.6 nm, 11.2nm) and (25.6 nm, 24.0 nm, 16.6 nm) in three dimensions can be achieved for iMFM monochromatic and polychromatic PSFs, with a 4-fold and 3.6-fold axial resolution improvement compared with its MFM counterparts. To prevent the light loss of the BS, a second camera can be introduced and placed at the other output of the BS, where resolution below 10 nm in three dimensions is obtainable. Another advantage of MFM and iMFM is the focal shift between tiles, which is known a priori and can be used to estimate the axial initial values of 3D position to improve the accuracy and convergence of the MLE localization algorithms. The reconstruction errors found by MLE with a proposed initial value estimation are well consistent with theoretical predictions.

For 3D wide field imaging, the dual-objective iMFM tile-OTF features about a 4-fold enlarged support of transferred spatial frequencies in the axial direction compared with single lens MFM. Therefore, the iMFM imaging system provides improved axial resolution and more isotropic 3D resolution in wide-field 3D extended object imaging in a single shot without focal scanning. It was also shown that even with chromatic aberrations produced from a 10 nm emission bandwidth, the iMFM is still capable of recovering high axial spatial frequencies beyond the detection cut-off. The axial resolution can be further improved if the dual objectives are also used for illumination in addition to collection as in I⁵M and 4Pi C type microscopes.

Just as in I²M/I⁵M/4Pi dual-objective microscopes, the improved axial resolution in iMFM comes at the cost of system complexity, because two opposing lenses and two MEGs are utilized for iMFM multifocal interferometric detection. However, the iMFM imaging system is a single shot detection without sequentially z scanning focal planes by moving either the sample stage or the camera, which make the acquisition process not only faster but also much easier and more convenient than traditional systems. The disclosed iMFM imaging system provides a useful tool in 3D dynamic event imaging in which both high temporal and spatial resolution are required.

The use of the word "a" or "an", when used in conjunction with the term "comprising" in the claims and/or the specification, may mean "one," but it is also consistent with the meaning of "one or more," "at least one," and "one or more than one."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Other objects, features, and advantages of the present invention will become apparent fro the following detailed description. It should be understood, however, that the detailed description and the examples, while indicating specific etribodiments of the invention, are given by way of illustration only. Additionally, it is contemplated that changes and modifications within the spirit and scope of the invention will become apparent to those skilled in the art from this detailed description.

What is claimed is:

1. A system to generate an image representation, the system comprising:
    a first objective that is configured to receive a first light beam emitted from a sample;
    a second objective that is configured to receive a second light beam emitted from the sample, wherein the first light beam and the second light beam have conjugate phase;
    a first diffractive element configured to receive the first light beam and separate the first light beam into a first plurality of diffractive light beams that are spatially distinct from one other;
    a second diffractive element configured to receive the second light beam and separate the second light beam into a second plurality of diffractive light beams that are spatially distinct from one other; and
    a detector that receives the first plurality of diffractive light beams and the second plurality of diffractive light beams, wherein the first plurality of diffractive light beams and the second plurality of diffractive light beams are simultaneously directed and focused onto different portions of an image plane of the detector.

2. The system of claim 1, further comprising one or more lenses and one or more mirrors that direct and focus each of the first plurality of diffractive light beams and the second plurality of diffractive light beams onto the different portions of the image plane of the detector.

3. The system of claim 1, wherein the first objective and the second objective are positioned on opposite sides of the sample.

4. The system of claim 1, wherein each of the first light beam and the second light beam comprises light from different depth planes within the sample.

5. The system of claim 4, wherein each of the first plurality of diffractive light beams comprises light from one of the different depth planes within the sample.

6. The system of claim 5, further comprising a processor in communication with the detector, wherein the processor is configured to generate, based on the first plurality of diffractive light beams and the second plurality of diffractive light beams received by the detector, a plurality of two-dimensional images corresponding to the different depth planes within the sample.

7. The system of claim 6, wherein the processor is configured to combine the plurality of two-dimensional images to generate a three-dimensional image representation of the sample.

8. The system of claim 1, wherein the first diffractive element and the second diffractive element are positioned in a Fourier plane of an optical subsystem of the system.

9. The system of claim 1, wherein each of the first diffractive element and the second diffractive element comprises a multi-focus grating (MFG), and wherein the multi-focus gratings include a grating pattern having a geometrical distortion.

10. The system of claim 9, wherein the grating pattern comprises a binary phase-only diffraction grating or a multi-phase grating.

11. The system of claim 9, wherein the multi-focus grating applies at least one phase shift to the first light beam to form the first plurality of diffractive light beams, wherein the at least one phase shift is equal to but opposite from a depth-induced phase error that is present in the first light beam that is emitted from out-of-focus planes in the sample.

12. The system of claim 11, wherein the multi-focus grating applies the at least one phase shift to a first wavefront in the first plurality of diffractive light beams and to a second wavefront in the second plurality of diffractive light beams, wherein the first wavefront and the second wavefront have conjugate phase.

13. The system of claim 1, wherein the detector comprises an electron-multiplying charge-coupled device detector.

14. A method for generating image representations, the method comprising:
  receiving, by a first objective in a first arm of an optical subsystem, a first light beam emitted from a sample;
  receiving, by a second objective in a second arm of the optical subsystem, a second light beam emitted from the sample, wherein the first light beam and the second light beam have conjugate phase;
  separating, by a first diffractive element in the first arm of the optical subsystem, the first light beam into a first plurality of diffractive light beams that are spatially distinct from one other;
  separating, by a second diffractive element in the second arm of the optical subsystem, the second light beam into a second plurality of diffractive light beams that are spatially distinct from one other; and
  receiving, by a detector, the first plurality of diffractive light beams and the second plurality of diffractive light beams such that the first plurality of diffractive light beams and the second plurality of diffractive light beams are simultaneously directed and focused onto different portions of an image plane of the detector.

15. The method of claim 14, further comprising directing, by one or more lenses and one or more mirrors, each of the first plurality of diffractive light beams and the second plurality of diffractive light beams onto the different portions of the image plane of the detector.

16. The method of claim 14, Wherein receiving the first light beam comprises receiving light from different depth planes within the sample, and wherein receiving the second light beam comprises receiving light from the different depth planes within the sample.

17. The method of claim 16, further comprising generating, by a processor in communication with the detector and based on the first plurality of diffractive light beams and the second plurality of diffractive light beams received by the detector, a plurality of two-dimensional images corresponding to the different depth planes within the sample.

18. The method of claim 17, further comprising combining, by the processor, the plurality of two-dimensional images to generate a three-dimensional image representation of the sample.

19. The method of claim 14, wherein each of the first diffractive element comprises a multi-focus grating (MFG) having a grating pattern with a geometrical distortion, and further comprising applying, by the MFG, at least one phase shift to the first light beam to form the first plurality of diffractive light beams.

20. The method of claim 19, wherein applying the at least one phase shift comprises applying a phase shift that is equal to but opposite from a depth-induced phase error that s present in the first light beam that is emitted from out-of-focus planes in the sample.

* * * * *